July 7, 1959
P. P. WALKER ET AL
2,893,380
MASSAGE AND EXERCISE MACHINE
Filed June 29, 1956
10 Sheets-Sheet 1
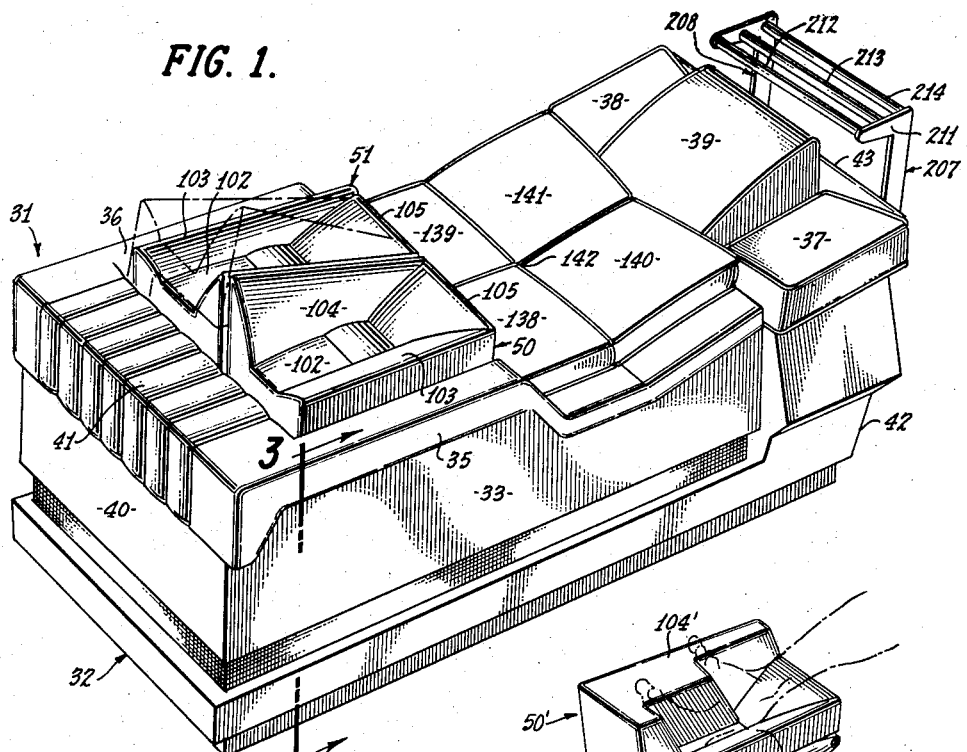
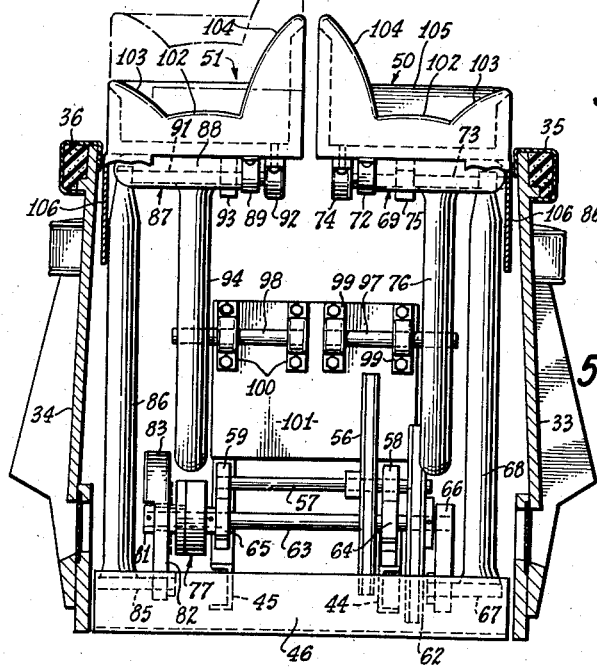
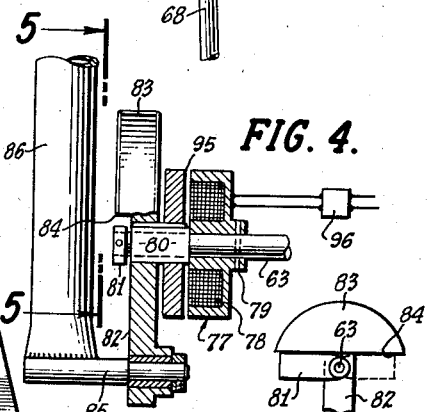
INVENTORS:
Patrea Patrick Walker &
Herman Laub III.
BY: R. E. Geanque
ATTORNEY.

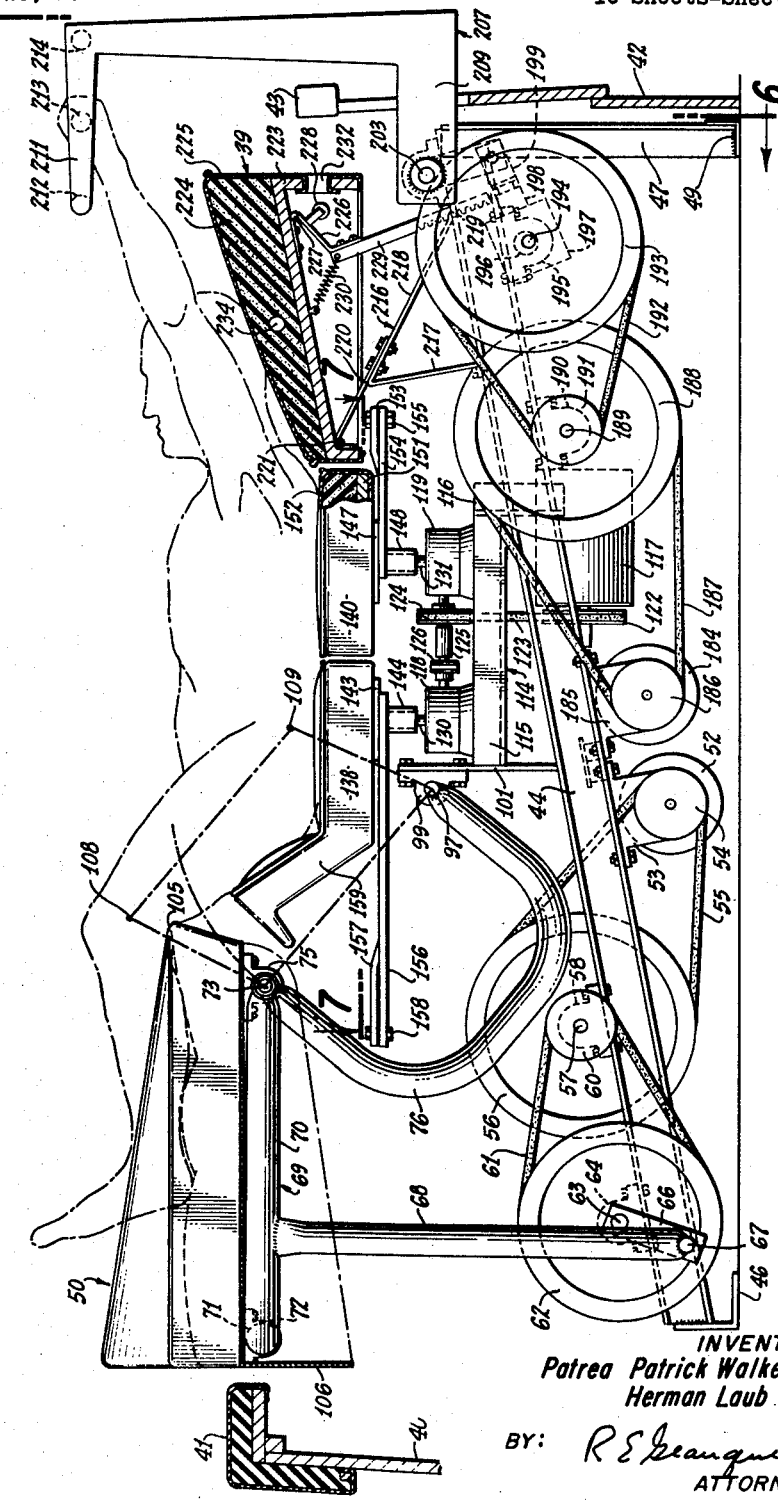

July 7, 1959

P. P. WALKER ET AL 2,893,380

MASSAGE AND EXERCISE MACHINE

Filed June 29, 1956

INVENTORS:
Patrea Patrick Walker &
Herman Laub III.

BY: R. E. Seaugue

ATTORNEY.

July 7, 1959 P. P. WALKER ET AL 2,893,380
MASSAGE AND EXERCISE MACHINE
Filed June 29, 1956 10 Sheets-Sheet 4

INVENTOR.
Patrea Patrick Walker &
Herman Laub III.

BY: R.E. Grangue
ATTORNEY.

July 7, 1959 P. P. WALKER ET AL 2,893,380
MASSAGE AND EXERCISE MACHINE
Filed June 29, 1956 10 Sheets-Sheet 5

INVENTORS:
Patrea Patrick Walker &
Herman Laub III.

BY: *[signature]*
ATTORNEY.

July 7, 1959 P. P. WALKER ET AL 2,893,380
MASSAGE AND EXERCISE MACHINE
Filed June 29, 1956 10 Sheets-Sheet 6

INVENTORS:
Patrea Patrick Walker &
Herman Laub III.

BY: R. E. Geangue
ATTORNEY.

INVENTORS:
Patrea Patrick Walker &
Herman Laub III.

ATTORNEY.

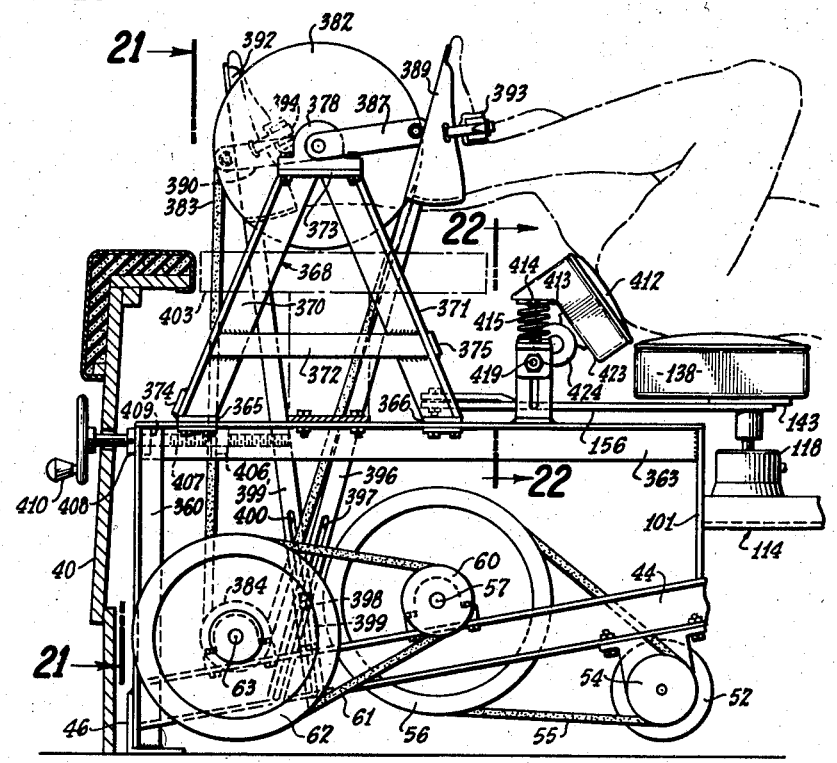
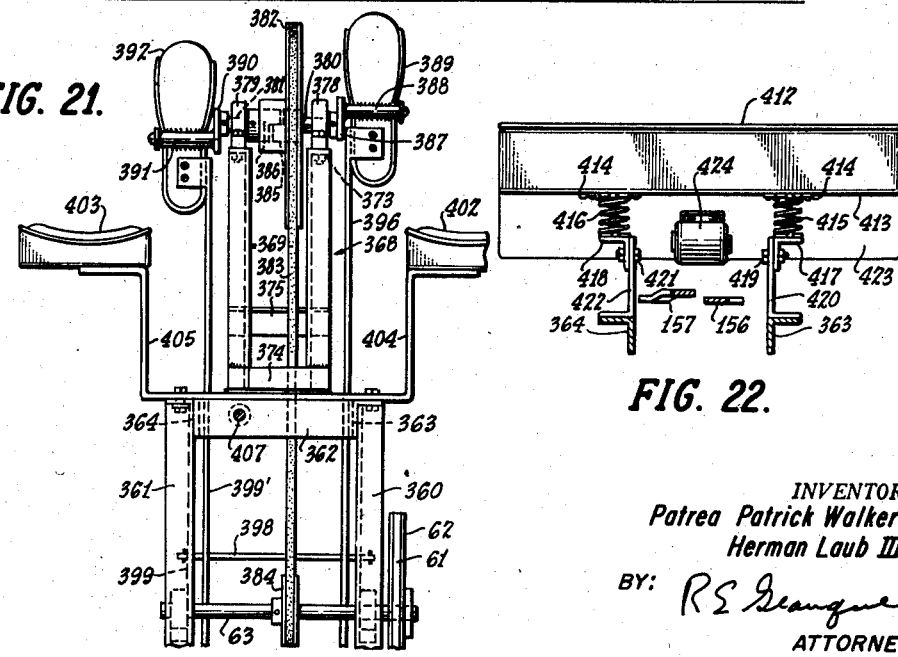

July 7, 1959  P. P. WALKER ET AL  2,893,380
MASSAGE AND EXERCISE MACHINE
Filed June 29, 1956  10 Sheets-Sheet 9

INVENTORS:
Patrea Patrick Walker &
Herman Laub III.
BY: R.E. Geangue
ATTORNEY.

July 7, 1959

P. P. WALKER ET AL 2,893,380

MASSAGE AND EXERCISE MACHINE

Filed June 29, 1956

INVENTORS:
Patrea Patrick Walker &
Herman Laub III.

BY:

ATTORNEY.

United States Patent Office 2,893,380
Patented July 7, 1959

2,893,380

MASSAGE AND EXERCISE MACHINE

Patrea Patrick Walker, Pacific Palisades, and Herman Laub III, Alhambra, Calif., assignors, by direct and mesne assignments, to Cecil Investment Company, a corporation of California Application June 29, 1956, Serial No. 594,765

24 Claims. (Cl. 128—25)

This invention relates to a massage and exercise machine and more particularly to a single machine which can massage and exercise the arms, legs and body portion of the patient without attaching any part of the patient to the machine and without the necessity of having an attendant present for purposes of instructing the patient in the use of the machine.

Prior machines of this type have been equipped to act on only one part of the patient and therefore the patient must be moved from machine to machine to obtain a complete treatment of all parts of the body. Also, an attendant must be present to supervise the patient and to secure the patient to some of the machines and adjust the machines to the size of the patient. The changing of machines is very time consuming and interrupts the treatment of the patient. Body pads which tip in the longitudinal direction of the machine have been utilized to treat the hips and shoulders and the action of these pads can be dangerous if the patient is not positioned on the machine in the proper manner by an attendant. Also, prior machines for treating the legs and ankles require the feet to be strapped to the machine and because of the type of motion utilized, the machine can be utilized for no other purpose.

The present invention incorporates in one single machine, a mechanism for manipulating the hips and shoulders of the patient, a mechanism for moving the legs of the patient in various manners and a mechanism for stretching the arms of the patient to various degrees. Because of the construction of the machine, it is unnecessary for the patient to move from machine to machine in order to obtain a complete treatment of all parts of the body and all components of the machine are ready to act when the patient is located in a prone position upon the machine. Therefore, the presence of an attendant during operation of the machine is not required. The mechanism of the machine for the hip and shoulder treatment comprise two shoulder pads and two hip pads located on opposite sides of the machine. All pads tip towards the common center point and are moved in a horizontal plane with bodily motion. The movement of the pads can be so controlled that each pad always moves away from and towards the adjacent hip pad and shoulder pad so that the flesh of the patient on both the shoulders and the hips is loosely supported by the body frame so that considerable massage action results. The massage of the flesh on the hips and shoulders also carries over to the flesh in the visceral section. Also, with the movement of the hip and shoulder pads opposed to each other, the head of the patient has no tendency to move and remains fixed so that the sensation of the pads on the patient is smooth and pleasant and more energy can be transferred to the body without the patient being uncomfortable. The pads can be operated at either slow or high speed, the slow speed giving an easy kneading of the muscles while the high speed results in high stimulation of the flesh and muscles.

Each of the hip and shoulder pads can move in circular motion in a horizontal plane or can move in various orbits in the horizontal plane. Also, other types of motions, such as tilting, can be imparted to the hip and shoulder pads without eliminating any of the other actions of the machine.

The mechanism of the leg motion is located at the end of the machine so that the mechanism can be operated while the patient is lying in the horizontal position on the hip and shoulder pads. The leg action mechanism can comprise two leg pads upon which the patient can place the legs and feet when lying on the machine and no other attachment is necessary. The leg pads can move either together or opposed to one another so that the motion of legs can simulae a bicycle exercise or a straight knee bend exercise. The leg pads can accommodate different leg lengths so that it is unnecessary for the attendant to adjust the feet and legs. Of course, other types of leg motions to which the feet are attached can also be utilized without eliminating any of the other actions of the machine.

The arm stretch mechanism of the machine is positioned behind the head rest and comprise reciprocating spaced hand bars which are gripped by the hands of the patient to obtain various degrees of backward arm stretch. Since the hand bars are located directly behind the head, the movement of the hand bars backwardly will lift the underbust and rib cage in order to exercise and reduce the abdomen. In order to vary the degree of arm stretch, the patient can move the hands to a hand bar either closer to or farther from the head and it is not necessary for an attendant to adjust the arm stretch mechanism for various sizes of patients. Thus, the patient can be prone upon the exercise and massage machine of the present invention and without further adjustment, the patient can be manipulated at the shoulders and the hips, at the legs and at the arms.

The present invention also includes a time control device which automatically controls the operation of the various mechanisms of the machine. This control device utilizes a punch card for operating each of the mechanisms at the desired speed and direction and for the desired period of time. Thus, the punch card can be punched for each patient in order to select the sequence and duration of operation of the various mechanisms which will be most beneficial to the patient.

A novel pillow block can be used with the invention and the upper surface is contoured to fit the hump of the shoulder and the back of the neck. This surface is flexible so that a vibrator can act on the shoulder hump and a heat lamp can warm the back of the neck. The pillow block also includes a speaker from which directions can be given from time to time to the patient in absence of an attendant. Also, arm exercising attachments can be secured to various components of the leg motion so that the arms can be placed toward the feet. By gripping these attachments, the hands will follow the particular motion of the attachments.

It is therefore an object of the present invention to provide a single massage and exercise machine having mechanisms for manipulating all parts of the body and which can be operated without attaching any part of the body to the machine.

Another object of the present invention is to provide a massage and exercise machine having a hip and shoulder exercising mechanism located centrally of the machine, a leg exercise mechanism at one end of the machine and an arm stretch mechanism at the other end of the machine.

Another object of the present invention is to provide a massage and exercise machine having a mechanism for manipulating the hips and shoulders of the patient, a mechanism for manipulating the legs of the patient and a mechanism for manipulating the arms of the patient, the action of each of said components being automatically controlled in order to control the commencement of the action and the duration of the action.

A further object of the invention is to provide a pair of shoulder pads and a pair of hip pads, each pad of which continually moves in opposition to adjacent pads and moves bodily in a horizontal plane.

A still further object of the present invention is to provide a leg exercising mechanism for a massage and exercising machine in which the legs and feet can be placed without attachment and which can impart to the legs and feet a bicycle movement or a knee bending action.

Another object of the invention is to provide an arm stretch device located at the head end of the machine for reciprocation to stretch the arms of the patient, said arm stretch device having hand bars located at various distances back of the head to vary the degree of arm stretch.

Another object of the invention is to provide a pillow block as a head rest for the patient which assumes the contour of the shoulder hump and neck of the patient, the pillow block containing a vibrator located at the hump, heating means located at the back of the neck, and a pillow speaker to give instructions to the patient during the treatment.

Another object of the invention is to provide an exercise and massage machine in which any mechanism for exercising any portion of the body can be changed without changing the other actions of the other mechanisms and without detracting from the over-all operation of the machine.

These and other objects of the invention not specifically set forth above will become readily apparent from the accompanying description and drawings in which:

Figure 1 is a perspective view of the massage and exercise machine of the present invention illustrating the leg pads, the hip and shoulder pads and the arm stretch.

Figure 2 is a side elevational view of the machine of Figure 1 with the casing removed to show the operating component.

Figure 3 is a transverse vertical section along line 3—3 of Figure 1 illustrating the operating components for moving the leg pads.

Figure 4 is a side elevational view partly in section illustrating the clutching mechanism for reversing the phase of the leg pads.

Figure 5 is an elevational view along line 5—5 of Figure 4 illustrating the two positions of the clutch arm.

Figure 8 is a view of a modification of the leg pads having cutout sections for various feet positions.

Figure 20 is an elevational view similar to Figure 2 of a modified leg action of the bicycle type and of a modified thigh pad having a vibrator.

Figure 21 is a transverse vertical section along line 21—21 of Figure 20 illustrating the pads for supporting the legs when the leg action is not in use.

Figure 22 is a transverse vertical section along line 22—22 of Figure 20 illustrating a spring suspension and vibrator motor for the modified thigh pad.

Figure 6:
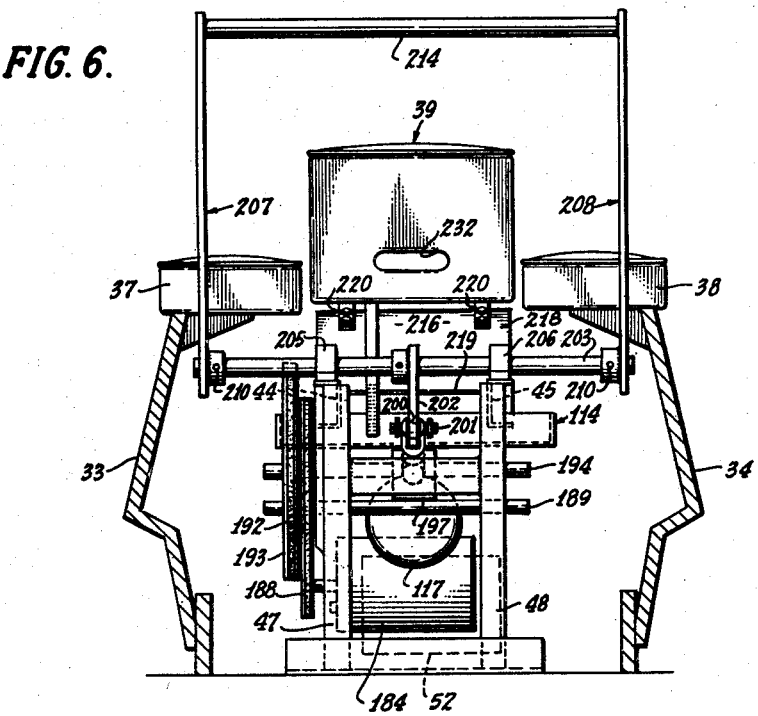
Figure 6 is a transverse vertical section along line 6—6 of Figure 2 illustrating the mechanism for operating the arm stretch.

Referring to Figure 1, the machine 31 has a casing 32 comprised of sides 33 and 34 having protective, padded edges 35 and 36, respectively, which generally follow the contour of the pads on the machine. The sides 33 and 34 also support protective pads 37 and 38, respectively, located on opposite sides of pillow member 39. The foot end 40 of the casing has a padded edge 41 while the head end 42 of the casing has a padded edge 43 spaced from the pillow member 39.

The interior of casing 31 contains a frame having two channel members 44 and 45 spaced apart and extending lengthwise of the machine and upwardly from the foot end. The lower ends of the channel members are connected by welding or other suitable manner to an angle iron 46 extending across the front of the machine and the opposite, upper ends of the channel irons 44 and 45 are secured, respectively, to vertical angle irons 47 and 48. The lower ends of angle irons 47 and 48 are secured together by an angle iron 49 extending across the bottom of the machine and by a cross member 49'. Thus, the two channel irons 44 and 45 are rigidly secured together and provide supports for the various operating mechanisms of the machine.

The legs and feet of the patient are located on leg pads 50 and 51 driven by a motor 52 secured to channel member 44 by means of bracket 53. The motor 52 has a pulley 54 receiving a belt 55 which passes around pulley wheel 56 connected to a shaft 57. The shaft is supported by pillow blocks 58 and 59 carried, respectively, by channel members 44 and 45. The end of the shaft 57, extending exteriorly of channel member 44, carries a small pulley wheel 60 receiving a belt 61 which passes around a larger pulley wheel 62. The wheel 62 is supported exteriorly of member 44 by means of a shaft 63 secured by pillow blocks 64 and 65 to the channel members 44 and 45, respectively.

One end of the shaft 63 carries a crank arm 66 having an opening for receiving pin 67 which is rigidly secured to an arm 68 extending upwardly to the leg pad 50. The upper end of arm 68 is welded to an L-shaped bracket 69 connected to pad 50 and having a leg 70 extending along the pad and a leg 71 extending across the pad. Bracket 72 holds leg 71 to pad 50 and the end of leg 70 receives a shaft 73 which extends across the backside of leg pad 50 and is secured thereto by pillow blocks 74 and 75. The shaft 73 is rigidly secured to one end of a U-shaped arm 76, the other end of arm 76 being pivoted to the frame in a manner to be described.

The other end of the shaft 63 is connected to a clutch mechanism 77 which is illustrated in detail in Figures 4 and 5. An electromagnet 78 is rigidly attached to shaft 63 by a pin 79 and the end of the shaft is rotatively mounted in a spline collar 80 and carries an arm 81. The collar 81 is located in a splined opening in an arm 82 which has an enlarged semi-circular head portion 83 with a projecting edge 84 to engage the side of the arm 81 regardless of which direction the shaft 63 is rotating. As illustrated in Figure 5, if the shaft is rotating clockwise, the arm 81 will engage the left side of edge 84 and if the shaft 83 is rotating counter clockwise, the arm 81 will engage the right side of edge 84.

The engagement of the arm 81 with the edge 84 will cause the arm 82 to rotate with the shaft 63 and the arm 82 has an opening for receiving a pin 85 fixed to the end of an upright arm 86. The upper end of the arm 86 is connected with an L-shaped member 87 which is similar in shape to the member 69 and has a front leg 88 secured to the under surface of the leg pad 51 by means of a bracket 89. The other leg (not shown) extends along the length of the leg pad 51 and receives a shaft 91 which is attached to the underside of pad 51 by means of pillow blocks 92 and 93. The shaft 91 is rigidly carried by a U-shaped arm 94 which is similar in construction to the arm 76 and is pivoted at the other end to the frame.

When the arm 81 is in the full line position of Figure 5 and the shaft 63 is rotated in a clockwise direction, the arms 68 and 86 will move up and down together and the pads will be opposite each other as shown by the full line positions of the pads in Figures 1 and 3. However, when the direction of shaft 63 is reversed, arm 81 will move to its dotted line position in Figure 5 and will be displaced 180° from crank arm 66 so that the pads 50 and 51 will move opposite to each other. One pad will be in the up position when the other pad is in the down position as illustrated in Figure 3 by the position of pad 50 and the dashed line position of pad 51. In order to permit this relative rotation of the arm 81 relative to head 83 and at the same time lock the arm 81 to the arm 82 so that loping of the pad 51 will not result, a splined armature member 95 is slidably carried by collar 80 for movement along the collar. Upon energization of the electro magnet 78, the armature 95 will be held in the field of the electromagnet and will cause the arm 82 to move with arm 81 and will hold edge 84 in engagement with the side of arm 81. Therefore, it will not be possible for the arm 82 to move ahead of the arm 81 and place the pads out of synchronism.

The electro magnet 78 is energized by a centrifugal switch 96 which is responsive to the speed of motor 52 and the switch does not close to energize the magnet until after the motor approaches operating speed in either direction. Thus, the armature is not immediately held by the electro magnet so that the arm 81 is free to change position depending upon the direction of rotation of motor 52. Therefore, the shaft 63 can move the upright arms 68 and 86 either together or 180° out of phase, depending on the direction of rotation of the shaft, and the clutch 77 will positively maintain the phase between the pads.

The other ends of the U-shaped arms 76 and 94 are pivotally connected to shafts 97 and 98, respectively, which are mounted by pillow blocks 99 and 100, respectively, attached to upright plate 101, carried by channel members 44 and 45. Because of the shape of arms 76 and 94, they will not interfere with the motion of the hip pads of the machine, which will later be described. The upward movement of the pad 50 by the arm 68 will cause some upward movement of the shaft 73 and the front end of the pad 50 will also move upwardly about the shaft 73 to give the pad a tipping action as it moves upwardly. This action is, of course, reversed on the downward movement of the arm 68. Each of the leg pads 50 and 51 is supported by a frame and has a groove defined by bottom 102, an outer side 103 and an inner side 104. The bottom 102 slants upwardly to edge 105 which is located at the knee of the patient when the patient lies upon the machine. The sides 104 are fitted closely together so that upon movement of the pads in opposed directions, there is no possibility of foreign matter becoming wedged between the pads. Also, each of the pads has a skirt 106 depending downward from sides 103 so that no space will be present as the pads move upwardly away from the padded edges 35 and 36.

Referring to Figure 2, the knee joint 108 and hip joint 109 of the patient, along with the axis of shafts 73 and 99, form a substantially parallelogram arrangement. Thus, it is apparent that as the shaft 73 and arm 76 move up and down about the shaft 99, the thigh of the patient will rock about the hip joint 109. Also, because of the tilting of the pad 50 about the shaft 73, the calf of the leg will also be moved up and down relative to the knee joint 108. Thus, with the knee located at edge 105, differences in thigh length will not substantially change the parallelogram arrangement. Thus, it is unnecessary to adjust the leg pads in accordance with the height of the patient and no attendant is needed to attach the legs to the leg pads. The knee joint will follow substantially an oval path and the foot will also follow an oval path simulating a walking pattern. When both pads move together in phase, the pads will give a knee bending action and when the pads move oppositely to one another, a bicycle type of action will result.

The motor 52 can be driven in opposite directions and at two different speeds in order to give slow and a high speed to the leg pads. In Figure 8, a modified leg pad 50′ is attached to upright arm 68 by means of the L-shaped member 69. The leg pad has an outward side 103′ and an inner side 104′ and contains a series of steps which are spaced outwardly from one another towards the foot end of the pad. Each of the steps provides a firm upright portion against which the foot of the patient can be positioned to obtain positive action on the leg and, of course, the steps are provided to compensate for different lengths of legs.

Figure 9:
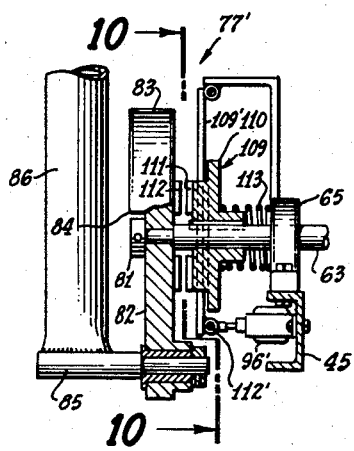
Figure 9 is an elevational view similar to Figure 4 illustrating a modification of the clutching means for the leg pads.
Figure 10:
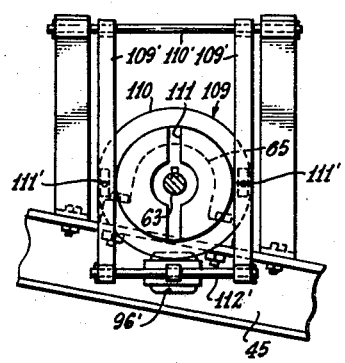
Figure 10 is an elevational view along line 10—10 of Figure 9 showing the actuation for the modified clutching means.

A modification of the clutch between shaft 63 and arm 82 is illustrated in Figures 9 and 10 and designated as 77′. The shaft 63 projects through arm 82 and carries arm 81 which engages the edge 84 of the head member 83 in the same manner as described in connection with Figure 5. The shaft 63 carries a clutch member 109 having a collar 110 and a slot 111 in the face thereof. The clutch member 109 is slidable on the shaft 63 through a splined connection and is biased in the direction of lugs 112 on member 83 by a spring 113 acting between clutch member 109 and pillow block 65. A pair of arms 103′ are pivotally connected to a shaft 110′ which is supported from channel member 45 and these arms have slots for receiving pin 111′ carried by the collar 110. The lower ends of the arm 109′ are connected together by a shaft 112′ which, in turn, is connected with the armature of solenoid 96′. Solenoid 96′ will normally hold the clutch member 110 away from the lugs 112 to permit the shaft 63 to change directions and to build up speed. The solenoid 96′ can be controlled by a thermo element connected across the input lines to the motor so that after the motor has heated up, the solenoid 96' will be actuated to release the clutch member 109 and permit it to be moved by spring 113 to place lugs 112 in groove 111. After such connection is accomplished, the shaft 63 and the arm 82 will be positively locked together and will rotate together in either direction depending upon the location of the member 81 and the direction of rotation of motor 52. Thus, the clutch 77' provides a mechanical connection between the shaft 63 and the arm 82, whereas the clutch 77 provides an electrical holding connection. It is understood the solenoid 96' can be controlled by the centrifugal switch which controls solenoid 96 and that solenoid 96 can be controlled by the thermal switch which controls solenoid 96'.

Hip and shoulder pads

A frame member 114 is formed by the upright plate 101 and an angle member 115 extending along each of the channel members 44 and 45. An upright angle member 116 is secured to each of the channel members and extends downwardly to support motor 117 centrally between the channel members. The members 115 carry a support for gear reduction units 118, 119, 120 and 121 (see Figure 7) which can be of any well known construction. The motor 117 has a pulley 122 connected by belt 123 with pulley 124 on the shaft 125 connected with gear reduction units 118 and 119. The shaft 125 also has a pulley 126 which is connected by belt 127 to a pulley 128 on shaft 129 and shaft 129 connects with gear reduction units 120 and 121. Since the pulleys 126, 128 are of the same size the shafts 125 and 129 will rotate at the same speed. The gear reduction units 118, 119, 120 and 121 have, respectively, output shafts 130, 131, 132 and 133 which carry, respectively, cam portions 134, 135, 136, 137 and these cam portions are rotated by the gear reduction units at the desired speed and in the desired direction.

Located above the gear reduction units are the two hip pads 138 and 139 and the two shoulder pads 140 and 141. While the bottom surface of each of these pads can be horizontal, the top surface of the pads are all tipped towards the common corner 142 (see Figure 1) for the purpose presently to be discussed. The hip pad 138 has attached to its under surface a frame member 143 which has a circular extension 144 to receive the cam portion 134 and in a similar manner, the hip pad 139 has attached to its under surface a frame member 145 having a circular extension 146 which receives the circular cam portion 136. In a similar manner the shoulder pad 140 has attached to its under surface a frame member 147 which has a circular extension 148 to receive the cam portion 135 and the shoulder pad 141 is secured to a frame member 149 having a circular extension 150 which receives the circular cam portion 137. Both the body pads and shoulder pads are therefore supported in position by the end of the cam portions and are moved upon rotation of the cam portions by the gear reduction units.

Suitable means can be provided to maintain the pads oriented during rotation of the cam members. Each of the pads has a rigid bottom frame member 151 to support padding 152 and the edges of the pads can be placed very close together and can be permitted to move against each other because of the flexibility of the padding. In order to prevent excessive rubbing between the shoulder pads as they come together, the frame members 147 and 149 carry rigid arms 153 and 154, respectively, which are placed at an angle and the ends of the arms are pivotally connected together by a pin 155. Thus, instead of the pads 140 and 141 having a true bodily circular motion, the edges of the pads will move in an elliptical path because of the rocking motion resulting about pin 155. Thus, rubbing between pads is greatly reduced. In the same manner, the frame members 143 and 145 for the hip pads are connected with arms 156 and 157, respectively, which are pivoted together at their ends by a pin 158. Since the arms 156 and 157 are longer than the arms 153 and 154, less pivotal movement and more rotational movement will result in the hip pads 138 and 139. At the common corner 142, all pads will move substantially in a circular path because the pivot pin for the tying arms move towards and away from this corner.

Figure 7:
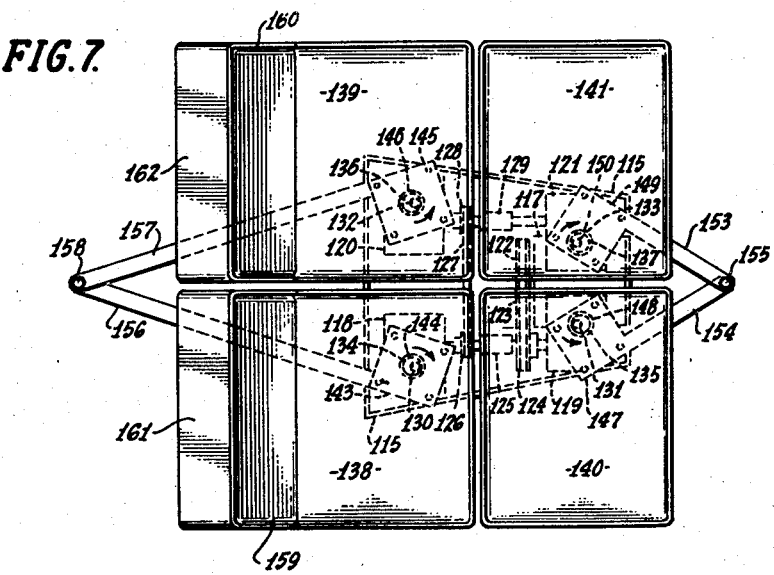
Figure 7 is a horizontal section along line 7—7 of Figure 2 illustrating the mechanism for moving the hip and shoulder pads.

Referring to Figure 7, the relative position of cam portions 135 and 137 will cause the shoulder pads to move towards and away from each other and the relative position of cam portions 134 and 136 will cause similar movement of the hip pads. Also, each hip pad will move towards and away from its adjacent shoulder since the gear reduction units are constructed to rotate the cam portions in the directions of the arrows in Figure 7. Thus, the movement of each pad will be opposed to that of adjacent pads. The hip pads 138 and 139 carry thigh pads 159 and 160, respectively, which have depending edges 161 and 162, respectively, located adjacent the leg pads 51 and 52. As illustrated in Figure 2, the thigh pads 159 and 160 serve to direct the thighs so that the calves of the legs will rest comfortably in the leg pads and serve to cover the space between the leg pads and the hip pads.

In operation of the hip and shoulder pads, the patient lies prone upon the machine with the hips located on pads 138 and 139 and the shoulders located on pads 140 and 141 and the opposed bodily movement of the pads will effectively massage and exercise the muscles and flesh which are free because of the tilt of the pads toward the common corner 142. Also because of the opposed motion, there will be no tendency for the head of the patient to move and thus, more energy can be transferred to these body portions without the patient becoming uncomfortable. The motor 117 can be operated at low speed to give a slow kneading action of the muscles and at high speed to give a high stimulation of the muscles. Since the thighs of the patient are located on pads 159 and 160, these portions of the body will also receive a kneading action. Also, because of the width of the shoulder pads, a massage action will result on the back of the arms when the arms are extended along the body.

Figure 11:
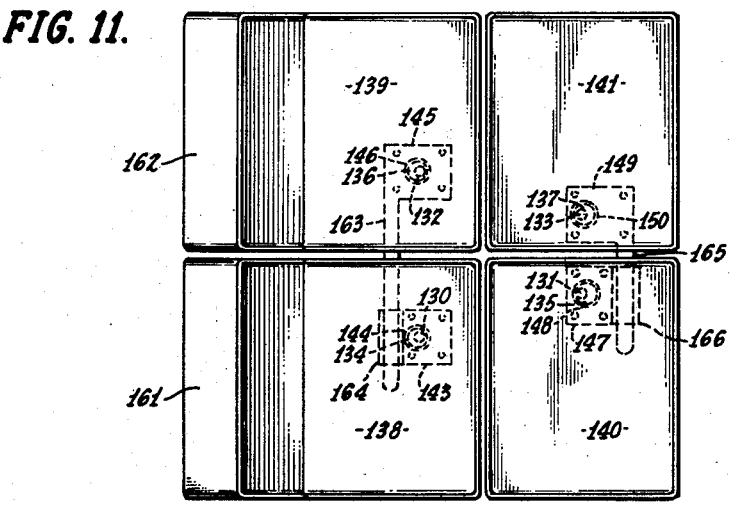
Figure 11 is an elevational view similar to Figure 7 of a modification of the mechanism for moving the hip and shoulder pads to obtain true circular bodily movement.

The pads can be connected together in various manners to modify the bodily motion of the pads by the cam portions. For instance, in Figure 11, a modification is illustrated which eliminates the arms 153, 154, 156 and 157. A bar 163 is attached to frame member 145 of the pad 139 and extends across the hip pads into a slide 164 in frame member 143 of hip pad 138. In the same manner, the frame member 149 for shoulder pads 141 has a bar 165 which extends into a slide 166. During rotational movement of the cam portions connected with the frame members, the bars 163 and 165 will move back and forth in slides 164 and 166, respectively, to maintain the orientation of the pads and cause opposed bodily movement of the pads in true circular paths. It is apparent that a hip pad and a shoulder pad could be connected together in a similar manner to obtain the same type of motion. Also, because of the small motion imparted to the pad, it has been found unnecessary to have any sort of means tying the pads together since the pads are close enough together to prevent any substantial cocking of the pads during movement.

Arm stretch

An electric motor 184 is supported from the channel member 44 by bracket 185 and drives the pulley 186, which is connected by belt 187 to pulley 188. The pulley 188 is supported by shaft 189 carried by pillow blocks 190 attached to the channel members 44 and 45 and the shaft 189 carries a smaller pulley 191 connected by a belt 192 to pulley 193. The pulley 193 is supported by shaft 194 attached by pillow block 195 to members 44 and 45. The shaft 194 has a cam member 196 located between the channel members and is received by a cam block 197 which has an adjustable arm 198 extending towards the head end of the machine. The end 199 of the arm 198 has a slot 200 and a pin 201 secures the end of arm 202 within the slot. The other end of the arm 202 is rigidly fixed to a shaft 203 by means of a pin 204 and shaft 203 is rotatably supported by the pillow blocks 205 and 206 on channel members 44 and 45. U-shaped arms 207 and 208 each have a leg 209 rigidly secured to an end of shaft 203 by a pin 210 and have a leg 211 extending towards the pillow member 39. A plurality of arm bars 212, 213 and 214 extend between the leg 211 of the arms 207 and 208 in order to provide hand grips for the patient.

The pillow member 39 is supported by an angular frame 216 having one leg 217 rigidly secured to channel members 44 and 45 and another leg 218 extending at an angle to leg 217 and having an edge 219. A member 220 is attached to the surface of the leg 218 and is pivotally connected by pin 221 to the frame 223 of the pillow member. The frame 223 supports suitable padding 224 which is contained in cover 225 and an angular arm 226 is pivoted by pin 227 to the underside of frame 223. The arm 226 has a handle 228 and is connected with a ratchet arm 229, the teeth of which are held in engagement with edge 219 by spring 230 connected between the frame 223 and the arm 229. The frame 223 also has an opening 232 through which the knob 228 can be reached and pulled to permit the pillow member 39 to pivot about pin 221 to the desired position. Thereafter, the release of the knob will cause a tooth of the arm 229 to engage edge 219 and hold member 39 in the set position.

As illustrated in Figure 2, the head of the patient is placed upon the pillow member 39, with the shoulders of the patient on the pads 140 and 141. In order to utilize the arm stretch, the patient will reach backwards to grab one of the arm bars 212, 213 or 214 which are located behind the head. The operation of motor 184 will cause the arm bars to rock about shaft 203 and the patient will grip the bar which imparts a comfortable stretch to the arms. The amount of stretch can be varied by simply moving the hands from one arm bar to another. Of course, the number of arm bars carried by the legs 211 can be varied to provide additional arm stretch positions. Because of the powered motion, the stretch of the arm will lift the underbust in order to exercise the abdomen and the shoulders will be rotated backwardly to lift the rib cage and reduce the abdomen. The arm stretch is suitable for all sizes of patients and the patient can select the arm stretch which feels the best without the aid of an attendant. When the nearer bar 212 is gripped, there can be some elbow bending exercise resulting from the rocking of the arm bar and when the bar 214 is gripped, more of a stretching action will result. Also, the motor 184 can be operated at low and high speeds to vary the action of the arm bars.

Thus, as has now been described, the machine of the present invention will permit the patient to be placed prone on the machine with the hips and shoulders on the hip and shoulder pads, the legs on the leg pads, and the head resting on the pillow member. Manipulations of all body parts can be accomplished by the single machine through control of the motors 52, 117 and 184 without bodily moving the patient off of the machine. It is understood that one or more of the actions can take place at the same time, since the motion of each of the hip and shoulder pads is approximately three-eighths inches at the center and the stretch of the arm bars is one and one-half or two inches. As previously stated, the speed of motor 184 which drives the hip and body pads can be controlled at either a low or high speed to change the action of the pad from a slow easy kneading of the muscles to high stimulation of the muscles and the leg motor 52 has two speeds forward and two speeds reverse in order to vary the speed of the leg pads and accomplish either the knee bending action or the bicycle action. Also, the arm stretch is capable of operating through motor 184 at two different speeds. The padding 224 can incorporate a pillow speaker 234 through which instructions can be given to the patient while lying prone on the machine and thus, the patient can be given these instructions at a position located remote from the location of the machine.

Automatic control of machine operation

Figure 12:
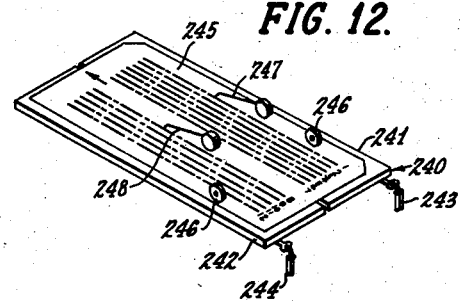
Figure 12 is a perspective view of the automatic control device illustrating the card rows and wipers for sensing the openings in the cards.

Referring to Figure 12, a control mechanism 240 comprises two conducting plate sections 241 and 242 which are connected, respectively, with leads 243 and 244. The sections 241 and 242 support a punch card 245 which is moved onto the plate sections by drive rollers 246 at the opposite edges of the card. The card contains a series of rows designated 1 to 7 above section 241 and 8 to 12 above section 242. A wiper 247 is located at each of the rows 1 to 7 and a wiper 248 is located at each of the rows 8 to 12, only one pickup being shown for each side and it is understood that the pickups are in line with each other across the card. The card 245 is punched along the various rows to permit the wipers to contact the conductive plates at desired times and in desired sequence. Each time a wiper 247 encounters an opening in the card, a circuit will be completed through the plate section 241 and each time a wiper 248 encounters an opening, a circuit is completed through plate sections 242.

Figure 13:
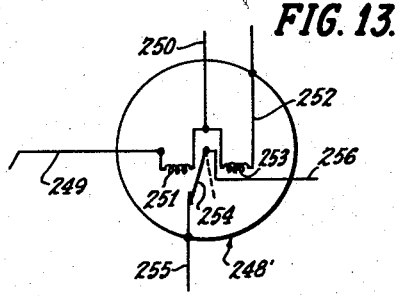
Figure 13 is a diagrammatic illustration of one of the relays operated by the punch card.

A wiper 247 and a wiper 248 is each connected to a relay 248' illustrated schematically in Figure 13. A line 249 is connected to one of the wipers 248 at rows 8 to 11 and a line 250 is connected to one of the pickups 247 at the rows 1 to 7. Thus, when the wiper 248, connected to line 249, and the wiper 247, connected to line 250, both encounter holes in the punch card, a circuit is created through solenoid winding 251. The line 252 is connected to the wiper 248 at row 12 of Figure 12 and when an opening is encountered by this wiper and by the wiper 247 connected to line 250, a solenoid winding 253 is energized. A snap action switch 254 is mounted between the solenoid windings 253 and 251 and upon energization of the winding 251, the switch arm 254 will be snapped in a direction to complete the circuit through lines 255 and 256. This circuit will remain until the line 252 is energized by a hole in row 12 in order to actuate winding 253 and snap the switch arm 254 to the open position, illustrated by the dotted line position of Figure 13. Lines 255 and 256 of the various relays control the circuits for the various motors of the machine.

Figure 14:
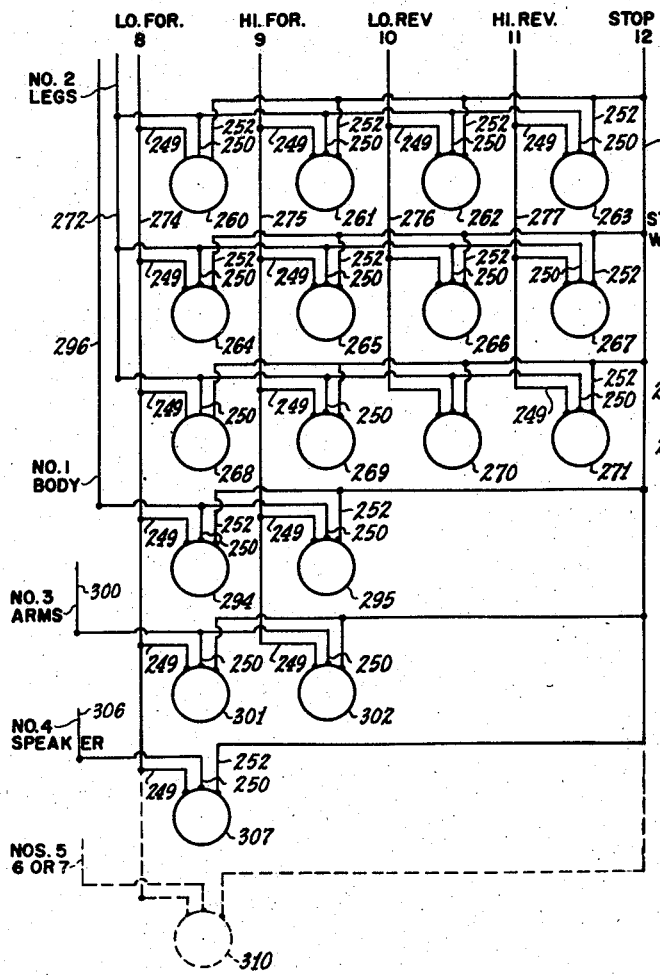
Figure 14 illustrates the schematic wiring diagram for operating the various relays to control the individual mechanisms of the machine in the desired manner.

Referring to Figure 14, a series of twelve relays 260 through 271 (identical in construction with relays 248') are illustrated for obtaining the high and low speeds, both forward and reverse, for the leg pad motor 52. The row 2 on the card controls the wiper 247 which is connected to line 272 and line 272 connects with the leads 250 of each of the solenoids 260 through 271. Also, the wiper 248 at row 12 of the card is connected to a line 273 which, in turn, connects with all of the leads 252 of the relays 260 through 271. The leads 249 of relays 260, 264 and 268 are connected through lead 274 to the wiper 248 at row 8 of the card and openings in this row initiate the low speed, forward operation of motor 52. The next bank of relays 261, 265 and 269 have their leads 249 connected through a line 275 to the wiper 248 at row 9 on the card and openings in this row initiate the high speed, forward operation of the motor 52. Leads 249 of the relays 262, 266 and 270 are connected through a line 276 to the wiper 248 at row 10 of the card and this row initiates the low speed, reverse movement of the motor 52 while the leads 249 of relays 263, 267 and 271 are connected through line 277 to the wiper 248 at row 11 of the card and openings in this row initiate the high speed, reverse action of the motor 52. Thus, it is apparent that when openings occur simultaneously in rows 2 and 8 of the card, switch arms 254 of the relays 260, 264 and 268 will be moved to complete the circuit through lines 255 and 256 of the relays to operate the motor in the forward direction at low speed and after the motor has operated for a desired period of time, openings appearing in row 2 and in row 12 will serve to open the switches 254 of relays 260, 264 and 268 to stop the motor. Thereafter, the motor can be operated at high speed, forward by simultaneous openings in row 2 and row 9, at low speed, reverse by openings in row 2 and row 10 or at high speed, reverse by openings in row 2 and row 11. After each period of operation of the motor, the motor can be stopped by openings in row 2 and row 12.

Figure 15:
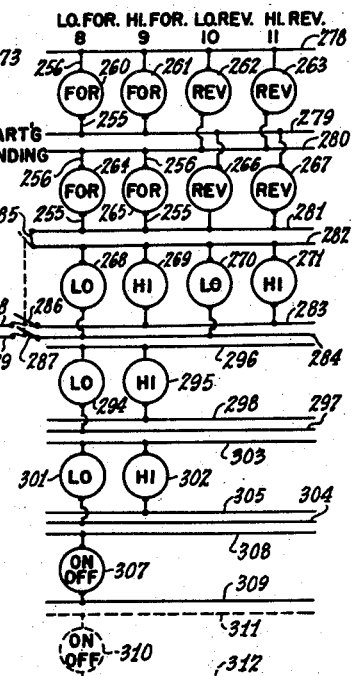
Figure 15 is a schematic wiring diagram for the output of the various relays shown in Figure 14.

Referring to Figure 15, the output circuits of relays 260 to 271 are illustrated. The relays 260 and 261 are connected across lines 278 and 279 while the relays 262 and 263 are connected across the lines 278 and 280. The relays 264 and 265 are connected across lines 281 and 280 while the relays 266 and 267 are connected across lines 279 and 281. The relays 268 and 270 connect between lines 282 and 284 while the relays 269 and 271 connect between lines 282 and 283. Upon receiving a signal from row 8 of the card, the relays 260 and 264 are closed and these relays connect to the opposite sides of a starting winding (not shown) to start rotation in the forward direction. Thus, the starting winding is connected to the positive line 281 through the relay 264 and to ground line 278 through relay 260. The positive potential at line 281 is obtained by connecting this line to line 282 through a normally closed centrifugal switch 285 and when the motor 52 gets up to speed, the centrifugal switch 285 will open to disconnect the starting winding from the potential on line 282. When the centrifugal switch 285 opens, switches 286 and 287 will close to connect line 283 to ground through the high speed motor winding 288 and to connect line 284 to ground through the low speed motor winding 289. Since the signal from row 8 operates relay 268, line 284 will be connected to the low speed motor winding after the motor comes up to speed in order to continuously operate the motor at low speed. Thus, the actuation of the three relays 260, 264 and 268 will cause the starting winding to bring the motor 52 up to speed in the forward direction and thereafter the operation of the centrifugal switch will place the low speed coil of the motor in operation.

The same action takes place when an opening appears in row 9 in that the starting coil for the motor is connected for forward motion by relays 261, 265 and the relay 269 connects with the high speed coil 288 of the motor 52 in order to continually drive the motor at high speed after opening of the centrifugal switch. In order to operate the motor 52 at low speed in the reverse direction, the relays 262 and 266 reverse the connections to the starting winding connected between lines 279 and 280 so that the motor starts to rotate in the reverse direction and upon closing of switch 287, the relay 270 will connect with the low speed coil of the motor to drive the motor at low speed in the reverse direction. In the same manner an opening in row 11 will cause the starting winding connected between lines 279 and 280 to start the motor in the reverse direction and after the motor is partially brought up to speed, the relay 271 will place the high speed coil of the motor in operation. The motor can also have a second starting winding continually connected between lines 281 and 278 in a permanent fashion. Thus, by selecting the proper position for the openings in row 2 and in rows 8, 9, 10 and 11, the leg pads 50 and 51 can be made to move together in a knee bending action either at a high or a low speed by openings in rows 8 and 9, respectively. Also, openings in rows 10 and 11 will reverse the direction of the motor to cause the leg pads to move 180 degrees out of phase because of the action of clutch 77 so that a bicycle action is obtained at high or low speed. Of course, the motor 52 can be stopped at any time by an opening in row 12 which connects through line 283 with all of the leads 252 of the relays 260—271.

Referring now to the operation of the hip and shoulder pads, the motor 117 is controlled by the wiper 247 at row 1 of the card which connects with leads 250 of relays 294 and 295 through line 296. The relay 294 has its lead 249 connected with the wiper at row 8 and the relay 295 has its lead 249 connected to the wiper at row 9. The leads 252 of both of these relays are connected to the wiper at row 12. Since the motor 117 is operated only in the forward direction at either low or high speed in order to vary the action of the body pads, the motor can be connected for low speed operation by corresponding openings in row 1 and row 8 and can be driven at high speed by openings in row 1 and row 9. Referring to Figure 15, relay 294 is connected between lines 296 and 297 while relay 295 is connected between lines 296 and 298. Since the motor does not change directions, it is only necessary to connect the motor between lines 296 and 297 for low speed operation by the relay 294 and between lines 296 and 298 by relay 295 for high speed operation and no relays are required for reversing the starting winding. In order to stop the motor 117, it is only necessary to have simultaneous openings in row 1 and row 12 in order to open the relays 294 and 295.

Since the arm stretch motor 184 is also operated only in the forward direction at either by high or low speed, this motor can be controlled by wiper 247 at row 3 of the card and this wiper is connected by line 300 to the leads 250 of relays 301 and 302. Lead 249 of relay 301 is connected through line 274 with the wiper 248 at row 8 while lead 249 of relay 302 connects through line 275 with wiper 248 at row 9. Referring to Figure 15, relay 301 connects between lines 303 and 304 in order to operate motor 184 at low forward speed while relay 302 connects between lines 303 and 305 to operate the motor at high forward speed. As in the case of motor 117, it is unnecessary to have separate relays for the starting winding of motor 184 since the motor does not reverse directions. Simultaneous openings in rows 3 and 12 will de-energize relays 301 and 302 in order to stop the motor 184 and stop the arm stretch motion.

In order to control the pillow speaker 234, the wiper 247 at row 4 of the card is connected by line 306 to the lead 250 of relay 307 and the lead 252 is connected to the wiper 248 at row 12 of the card. Lead 249 connects with the wiper at row 8 of the card and thus, when the simultaneous openings occur in rows 4 and 8, the relay 307 will be operated. As indicated in Figure 15, the relay 307 is connected across lines 308 and 309 and when simultaneous openings appear in rows 4 and 8, the speaker is turned on through lines 311 and 312 and when simultaneous openings appear in row 4 and row 12 the speaker will be turned off. Any number of other single operations, such as the speaker operation, can be controlled by a plurality of relays indicated at 310, each being operated by a separate wiper 247 at a card row (such as rows 5–7) above plate section 241.

By utilizing a punch card mechanism in which all of the operations of the machine can be controlled by openings in a number of rows of the punch card, it is possible to pre-diagnose the treatment of the patient and pre-select the sequence and duration of the various actions. For instance, the treatment can commence by having openings in rows 1 and 8 commence the motion of the hip and body pads at the low speed. After a period of time, the motor 52 can be stopped by openings in rows 1 and 12. Thereafter, openings in rows 1 and 9 will start the body and hip pad motion at the high speed and maintain this operation for the desired period of time and until openings appear in rows 1 and 12. Next, openings in rows 2 and 8 can initiate the knee-bending motion of the leg pads at the slower speed and thereafter the motor can be stopped by openings in rows 2 and 12 and the high speed knee-bending motion initiated by openings in rows 2 and 9. In the same manner, the leg pads can be put into the bicycle action at low speed by openings in rows 2 and 10 and later, the bicycle action can be increased to the higher rate of speed by openings in rows 2 and 11. After the leg motion has ceased, the patient can be instructed to grip the arm bars by simultaneous openings in rows 4 and 8 which turn on the pillow speaker and thereafter the arm bars can be started at the slow speed by openings in rows 3 and 8. After this motion has taken place for the desired period of time, the motor can be stopped by an opening in rows 12 and 3 and the high speed arm stretch action can be started by openings in rows 3 and 9. While one sequence of operations is described, it is understood that the actions can take place in any desired sequence for any desired period of time. Also, it is understood that two actions can run simultaneously by initiating one and then the other and that they can be stopped at any selected period relative to each other. By the use of the pillow speaker, the patient can be given continuous instructions not only as to the use of the machine but as to general health measures.

The automatic control system permits the patient to go through a complete treatment of all portions of the body without the necessity of an attendant being present to instruct the patient or to move the patient from one table to another. Because of the construction of the various body and leg pads, there is no danger of the patient becoming injured because of the relative movement of the pads. The pads are sufficiently close together in order to leave no unpadded shear or pinch points. Thus, all of the actions previously discussed resulting from the motions of the leg pads and of the hip and shoulder pads and of the arm bars can be imparted to the body to give beneficial message and exercise to all portions of the body in a single position. It is understood that the action on either the legs, the arms, or the hips and shoulders can be varied without departing from the present invention since the invention provides a single table in which all parts of the body can be exercised without requiring the patient to be moved.

Figure 16:
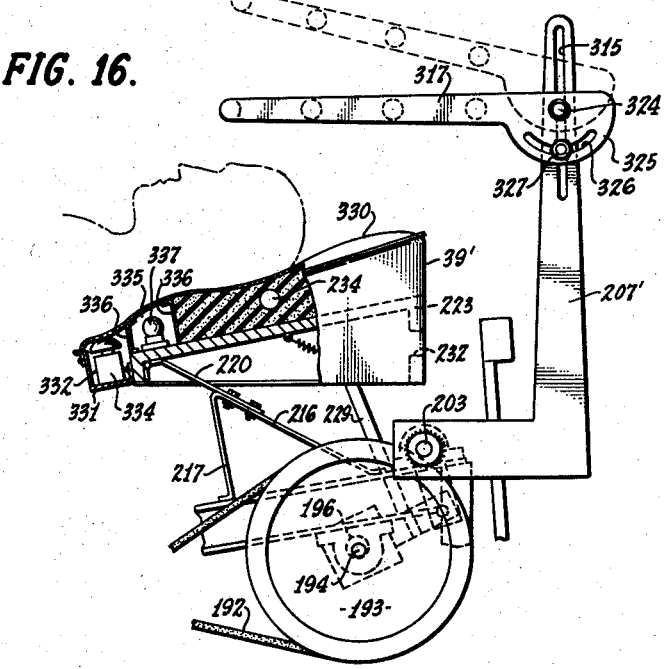
Figure 16 is a side elevational view, partly in section and similar to Figure 2, of a modified head rest having a vibrator, heating means and a pillow speaker and of a modified arm stretch mechanism.
Figure 17:
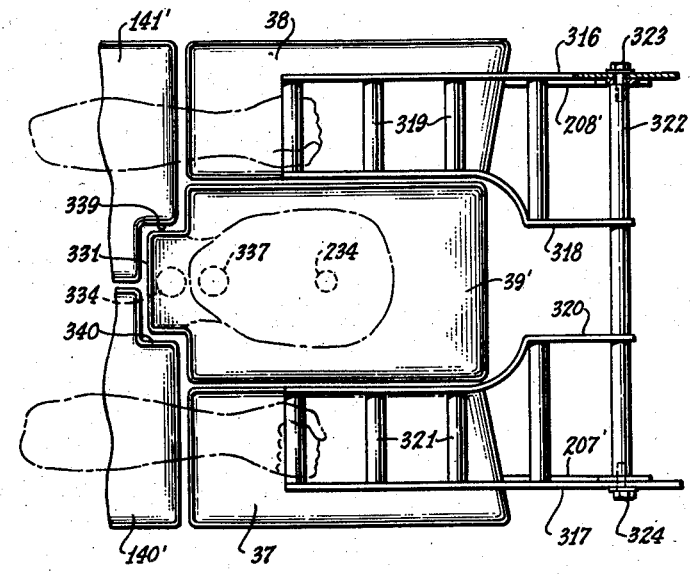
Figure 17 is a top plan view of the modifications illustrated in Figure 16 and illustrating the manner in which the head rest extends between the shoulder pads.

Referring to Figures 16 and 17, modifications of the arm stretch mechanism and of the pillow block 39 are illustrated. Each of the arms 207' and 208' are connected to the shaft 203 which is rotated by the cam portion 196 in the manner previously described. Each of the arms contain a vertical slot 315 which permits attachment of side members 316 and 317 to arms 207' and 208', respectively. The member 316 is connected with an inner frame member 318 by a number of arm bars 319 while member 317 is connected with inner frame member 320 by a number of arm bars 321. The ends of the frame members 318 and 320 are secured to a bar 322 which extends between the upper ends of arms 207' and 208' and abuts the inner surface of the arms at the slots 315. Adjacent the slots 315, the frame members 316 and 317 have openings for receiving screws 323 and 324, respectively, which pass through the slots and into the ends of the bar 322 in order to secure the bar in any selected vertical position. Also, each of the frame members 316 and 317 have enlarged portions 325 which contain curved grooves 326 concentric about the bar 322. A bolt 327 extends through each groove 326 and through the slot 315 in one of the arms so that the bolt can be locked to securely hold the frame in any selected tipped position about the axis of the bar 322. In the full line position of Figures 16 and 17, the arm bar frame is shown in a horizontal position directly above the head of the patient. When the arm bar is moved upwardly and tilted (see the dotted line position), the arms must be outstretched a greater amount to reach the arm bars 319 and 321 and a different stretching action of the arms would take place. In other words, the arms will move upwardly as well as horizontally when the arm bar frame is tipped upwardly. Thus, by adjusting the frame of the arm bars vertically and also tilting the arm bar frame, it is possible to obtain a variety of arm exercises and, as in the previous embodiment, the patient can move his hands from one set of arm bars to the next to obtain the action which imparts to the patient the desired amount of massage and exercise. A modified pillow member 39' comprises the frame member 223 mounted by the straps 220 and adjustable through the opening 232 in the manner previously described. The surface 330 of the pillow member is contoured to smoothly fit the back of the head, the back of the neck and the shoulder hump and this surface can consist of stretchable elastic material. Attached to one end of the pillow block is a support member 331 which forms a compartment 332 and the portion of the surface 330 above this compartment is elastic to conform to the hump at the back of the neck. A mechanical vibrator is mounted within compartment 332 and engages the surface 330 to cause vibration to be imparted at this portion of the body. The vibrator can be turned on and off by the automatic control mechanism previously described by placing the vibrator under the control of one of the miscellaneous relays 310 illustrated and described in Figures 14 and 15. A second compartment 335 is formed between the rigid supports 336 and contains a heat lamp 337 which is designed to warm the back of the neck of the patient. This heat lamp can also be controlled by one of the miscellaneous relays 310 or it can be turned on and off by a manual switch. In addition, the pillow member 39' contains the pillow speaker 234 previously described in connection with pillow member 39 and controlled through row 4 of the card 245. It has been determined that a very pleasant relaxing sensation can be obtained both from the vibration effect of vibrator 334 on the shoulder hump and from the warming of the back of the neck so that during the operation of the machine, the patient will be completely relaxed by a combination of one or both of these treatments for any desired interval of time.

It is understood that the modified arm stretch mechanism and pillow member illustrated in Figures 16 and 17 can be utilized in place of similar components shown in Figures 1 and 2 without changing the construction and operation of the leg pads and of the hip and shoulder pads. In order that the vibrator can be located at the shoulder hump, portions 339 and 340 are cut out of shoulder pads 140' and 141' to receive support member 331. Since the position of the shoulder hump will remain substantially stationary during operation of the shoulder pads, the hump can be comfortably supported by rigid support member 331.

Figure 18:
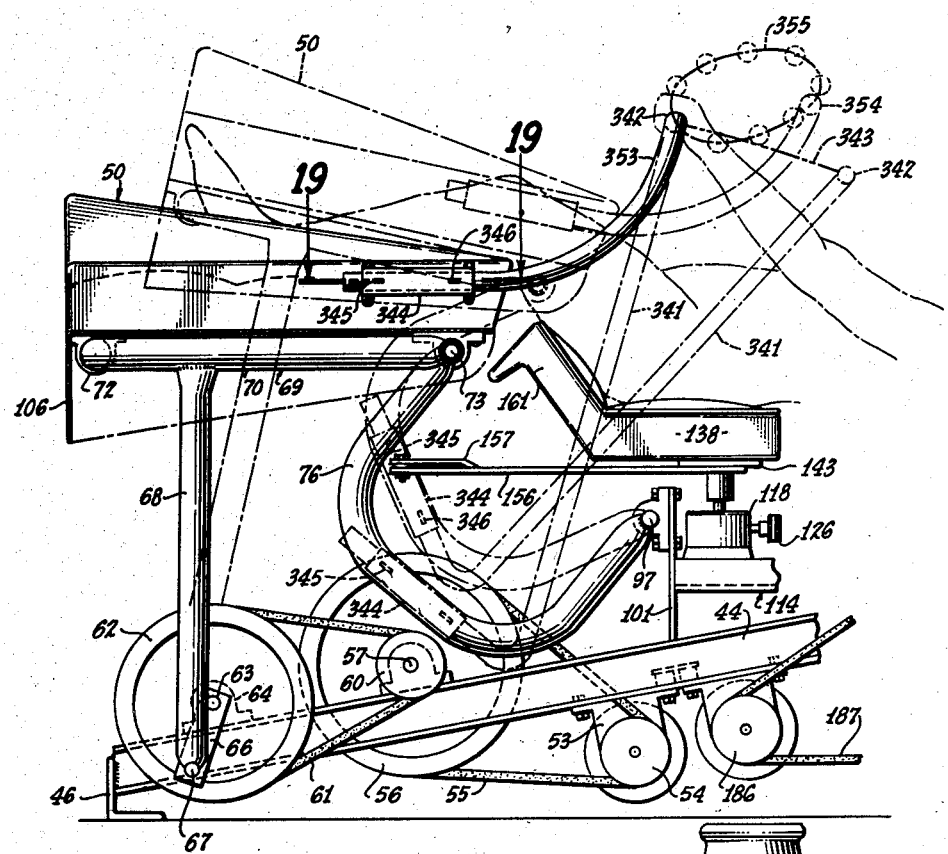
Figure 18 is a side elevational view similar to Figure 2 illustrating the various hand bars attached to the leg pad mechanism in order to provide various arm motions for the patient.
Figure 19:
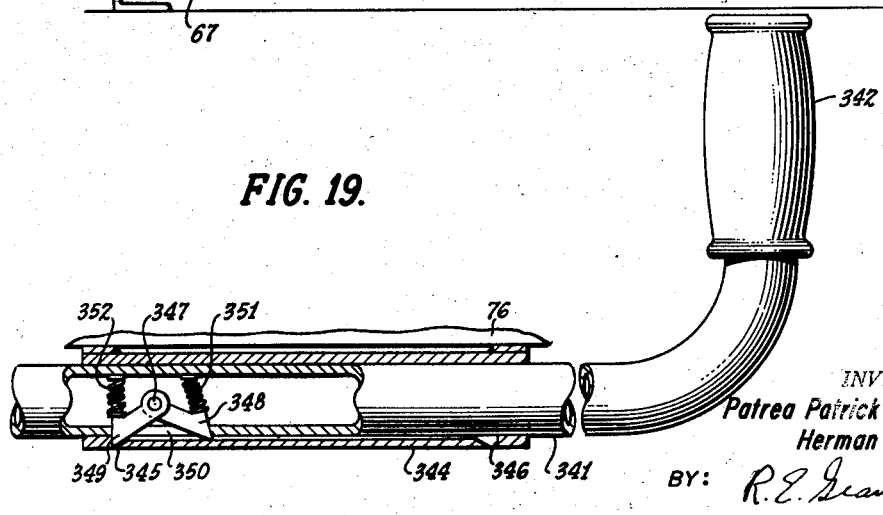
Figure 19 is a section along line 19—19 of Figure 18 showing one of the mounting mechanisms for the hand bar.

Referring to the modifications illustrated in Figures 18 and 19, arm bars are attached to various locations in the linkage for moving the leg pads in order that the patient's arms can be exercised while extended along the sides of the body. An arm bar 341 is secured to the bottom member of each of the U-shaped arms 76 and 94 and each arm extends upwardly past the side of a hip pad so that end 342 is in position to be gripped by the outstretched arm of the patient while lying prone on the machine. Since the arm 76 has a rocking movement about the shaft 97, the arm 341 will likewise have a rocking movement and will move between the dashed positions illustrated in Figure 18. The knob 342 will follow a substantially straight path as illustrated by the line 343. Thus, the patient's arm can be stretched towards the feet at one end of the stroke and at the other end, the elbow will be bent and exercised. As illustrated in Figure 19, each arm bar 341 is received in a cylinder 344 which is attached to the bottom member of the arm 76 or 94 by any suitable means and this cylinder has two notches 345 and 346 which determine the inward and outward positions of the arm bar 341. The interior of the end of arm bar 341 carries a pin 347 upon which are pivoted latches 348 and 349 extending through an opening 350 in the side of the arm and held against the side of the cylinder 344 by means of spring 351 and 352, respectively. With the latch 349 inserted in the notch 345, as illustrated in Figure 19, the arm bar 341 has been moved away from the patient so as not to interfere with the patient and to eliminate any attempt of the patient to utilize this exercise. However, when it is desired to use the arm bar 341, the patient pulls on the knob 342 in order to slide the arm bar 341 in the cylinder 344 until latch 348 engages notch 346. The spring bias on the latches will hold the arm bar in either position and because of the shape of notches 345 and 346, the movement of the arm bar will be limited to distance between the notches since notch 345 acts as a stop for latch 349 and notch 346 acts as a stop for latch 348.

An additional arm bar 353 can be attached to the exterior side of each of the leg pads 50 and 51, as illustrated in Figure 18, by means of the adjustable attachment comprising cylinder 344 illustrated in Figure 19 for arm 341. The attachment for each arm bar 353 is in the vicinity of shaft 73 which pivotally mounts the U-shaped arms 76 and 94 so that the knob 354 will follow an elliptical path 355 illustrated in Figure 18. In other words, the movement of knob 354 is made up of the rocking movement of shaft 73 about shaft 97 and also of the rocking movement of the leg pads about shaft 73. Thus, in addition to the arm being stretched forwardly when the arm bar 353 is in the full line position of Figure 18, the elbow and arm will also be rocked along path 355 as the arm bar 353 moves to the dotted line position of Figure 18. Since the arm 353 is adjustably connected to the leg pads, the patient can move these arm bars into and out of operating position by simply pushing on the bars in the manner described in connection with the arm bar 341. Since the arm bars 341 and 353 are on opposite sides of the machine, both arms of the patient will be exercised alike and these arm bars provide additional movements that can be supplied to the machine of Figure 1. Of course, the movement of the arm bars will follow the movement of the leg pads so that when the leg pads are out of phase, the arm bars will move in opposite direction and when the leg pads are in phase, the arm bars will move together. Also, as discussed in connection with the operation of the leg pads, the leg pads can be moved at high or low speeds so that the motion imparted to the arm bars can be mild or vigorous.

In another modification of the machine, leg pads 50 and 51 can be replaced by a bicycle mechanism such as illustrated in Figures 20 and 21. A pair of upright frame members 360 and 361 are connected to the cross member 46 and to channel members 44 and 45, respectively, and are also connected together at the top by cross member 362. A pair of longitudinal frame members 363 and 364 are supported between members 360 and 361, respectively, and the upstanding plate 101 and carry a pair of transverse cross members 365 and 366 which carry bolts at each end extending through slots in the upper face of the members 363 and 364. A pair of spaced angle frames 368 and 369 each have legs 370 and 371 supported respectively by cross members 365 and 366 and tied together by a brace 372 and by a plate 373. Also, a cross member 374 extends across the legs 370 and 371 at the foot end of the machine and a cross member 375 extends across the legs at the opposite side of the frames. The plates 373 for frames 368 and 369 support, respectively, pillow blocks 378 and 379 which receive, respectively, shafts 380 and 381. The pulley wheel 382 is rigidly fixed to the shaft 380 and is connected by a belt 383 to the pulley wheel 384 which is secured to the shaft 63 and driven by the pulley wheel 62. The size of the pulley wheel 384 can be varied to determine the speed at which the pulley wheel 382 will be rotated. The opposite end of shaft 380 carries a crank arm 387 having a pin 388 which pivotally supports a foot housing 389. Also, the end of shaft 381 carries a crank 390 to which is secured a pin 391 which pivotally mounts a foot housing 392. The feet of the patient are inserted into the foot housing and are secured therein by straps 393 and 394 attached to housings 389 and 392, respectively. Thus, when the pulley wheel 382 rotates in one direction, the clutch comprising members 385 and 386 will cause the crank arms 387 and 390 to rotate in phase so that the feet will receive a knee bending action. However, when the direction of the pulley wheel 382 is reversed, the feet housings 389 and 392 will be 180 degrees out of phase because of the change in coacting faces of the clutch to give a typical bicycle action. The clutch members 385 and 386 each have a 90 degree wedge, the wedges having two driving surfaces to engage each other depending upon the direction of rotation of shaft 380. It is understood that the pulley wheel 62 is driven by the motor 52 to rotate at two different speeds in either the forward or the reverse direction as previously described.

In order to obtain a bending action of the ankles, a tie bar 396 is secured to the foot housing 389 at the inner heel position and this bar extends downwardly between the longitudinal members 363 and 364 and has a slot 397 received by a rod 398 supported by an upright 399 attached to each of the channel members 44 and 45. In the same manner, a tie bar 399' is secured to the inner heel position of the foot housing 392 and passes between the support members 363 and 364 and has a slot 400 also received by the rod 398. The slots in tie bars 396 and 399' are of sufficient length to permit the bars to reciprocate upon rotation of the foot housings. Thus, the tie rods 396 and 399' serve to twist the ankles as the feet are rotated. As illustrated in Figure 20, as the leg is stretched out, the toe is pointed forward because of the angle of the tie bar, whereas when the knee is bent backwardly, the ankle will be twisted backwardly because of the change in angle of the tie bar. Thus, regardless of whether the feet are moving in phase in a knee bending action or out of phase in a bicycle action, each angle will be bent alternately forwardly and backwardly as the foot moves around a circular path. It is understood that the position of the pivot rod 398 can be varied along the length of the machine and can be raised or lowered in order to vary the twisting motion of the ankle.

The frames 368 and 369 for the foot housings are located close together at the longitudinal center of the machine so that when the leg exercising mechanism is not in use, the patient can support his legs on cushions 402 and 403 which are supported from the longitudinal members 363 and 364 by means of supports 404 and 405 attached to members 363 and 364, respectively. Sufficient space is left between the cushions and the frames 368 and 369 so that if the foot housing should accidentally be started, they would not come into contact with the legs placed upon the cushions 402 and 403. Because of the fact that leg lengths will vary, a threaded lug 406 is carried by the cross member 365 and receives the threaded end of a shaft 407 which is rotatively mounted in the cross member 362 by the collars 408 and 409. The end of the shafts projects through the end 40 of the casing and carries a rotatable wheel 410 so that upon rotation of the wheel 410, the transverse members 365 and 366 can be moved along the slots in the upper surface of the members 363 and 365 in order to move both frames 368 and 369 longitudinally along the machine to compensate for different leg lengths. Although the modifications of Figures 21 and 22 require an attendant to attach the feet and adjust the frames for the leg length, this modified leg mechanism can still be under the control of the automatic control system which controls the drive motor 52 and it is still unnecessary for the patient to move from machine to machine in order to obtain exercise and massage of all parts of the body.

Another modification of the invention, illustrated in Figures 20 and 22, illustrates a single thigh pad 412 which is separate from the hip pads 138 and 139 and replaces the thigh pads 161 and 162. The pad 412 is supported by two coil springs 415 and 416 each of which have the upper end secured to the undersurface 413 of the pad by a clamp 414. The other ends of the coil springs 415 and 416 are rigidly secured by clamps to angle members 417 and 418, respectively. The member 417 is attached by bolt 419 to an upright frame 420 carried by member 363 and angle member 418 is secured by bolt 421 to an upright frame 422 carried by support member 364. The frames 420 and 422 have slots receiving bolts 419 and 421, respectively, to permit vertical adjustment of pad 412. The undersurface 423 of pad 412 mounts a vibrator 424 which comprises an eccentric weight driven by a motor to cause a vibratory movement of the thigh pad 412 on the springs 415 and 416. This vibratory motor can be under the control of one of the rows of the card illustrated in Figure 12 and can be controlled by one of the miscellaneous relays 310 of Figure 14. While the vibrating thigh pad 412 is illustrated in connection with the leg motion of Figure 20, it is understood that such a vibrating pad could be used in the modification of Figures 1 and 2. The vibrating effect of the pad 412 on the thighs when the legs are supported by pads 50 and 51 of Figure 1 or by pads 402 and 403 of Figure 21, provides a massage action upon the thighs and has the effect of stimulating the circulation in the thigh area.

Figure 23:
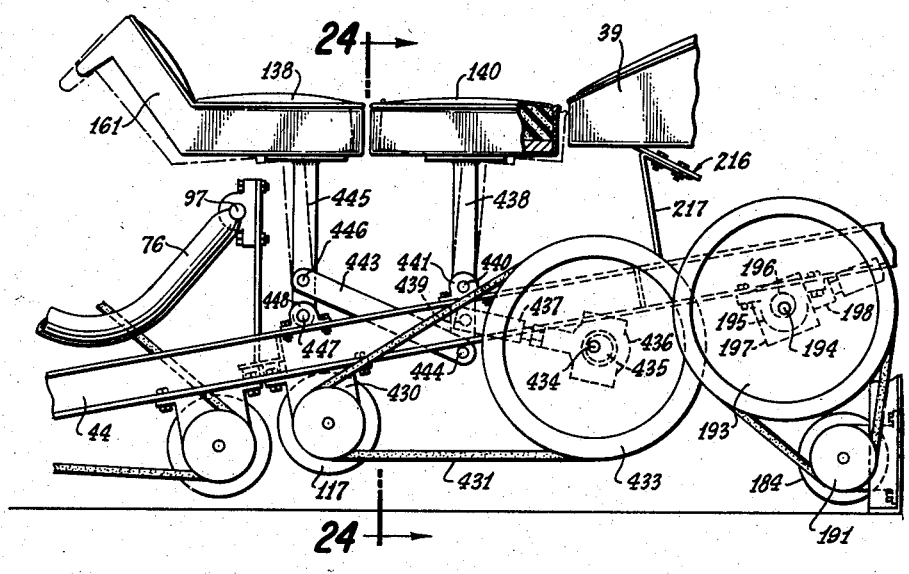
Figure 23 is a side elevational view similar to Figure 2 of a modification wherein the hip and shoulder pads are tilted longitudinally of the machine.
Figure 24:
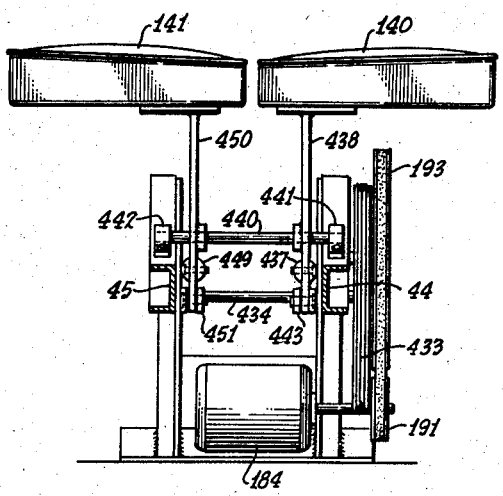
Figure 24 is a transverse vertical section along line 24—24 of Figure 23 showing the mechanism for moving the pads.

Referring now to Figure 23, a modification of the hip and shoulder pad movement is illustrated wherein the shoulder and hip pads on each side of the machine tip towards and away from each other. In this modification, the motor 117 of Figure 2 is supported on the underside of channel member 44 by means of a bracket 430 and the motor 117 drives a belt 431 through a pulley 432. This belt, in turn, connects with a larger pulley 433 carried by shaft 434 which is rotatably mounted by pillow blocks connected to the underside of channel member 44. Shaft 434 carries at each side a cam portion 435 and a cam follower 436 surrounds each of the cam portions. The follower on one side of the machine connects with an adjustable link 437 which, in turn, is pivotally connected by pin 439 to an end of the arm 438 which supports the shoulder pad 140 at its upper end. The arm 438 is pivotally mounted on a shaft 440 which extends across channel members 44 and 45 and is rotatable thereon by means of pillow blocks 441 and 442. The lower end of the arm 438 is connected to an end of an arm 443 by pin 444 and the other end of the arm 443 is pivotally connected to an arm 445 by means of pin 446. The arm 445 is secured to a shaft 447 which is rotatably mounted by pillow blocks 448 on each of the cross members 44 and 45. The upper end of the arm 445 supports the hip pad 138 for tilting movement about the pin 447.

The other cam portion 435 has a cam follower, similar to 436, which connects through adjustable link 449 to an arm 450 rotatably mounted by shaft 440. The upper end of arm 450 carries shoulder pad 141 and the lower end is connected by arm 451 to an arm (not shown) which carries hip pad 139 at its upper end and is similar in construction to arm 445. Since the cam portions 435 on each side of the shaft 434 are in phase, it is apparent that rotation of the shaft 434 will cause the shoulder pads 140 and 141 to tilt back and forth in phase. Also, since the links 437 and 451 are connected below the pivot point for the arms of the shoulder pads and above the pivot point for the arms of the hip pads, the hip pads will also move together and will move out of phase with the shoulder pads so that the hip and shoulder pads will have opposed movement as indicated by the dashed line position of Figure 23. By placing the cams 435 out of phase by 180 degrees, the movement of the shoulder pads will be out of phase as will be the movement of the hip pads, but the movement of each shoulder pad will still oppose the movement of the adjacent hip pad. It is understood that the motor 117 will be controlled by row 1 of the card illustrated in Figure 12 and can be driven at low or high speed. Because of the location of motor 117, it is necessary to move the motor 184 for the arm stretch back to the end of the machine so that it can drive the pulley 193. The hip and body pads are illustrated in the full line position of Figure 23 in their closest position and the angle of tilt is illustrated by the dashed line position. Thus, it is apparent that various types of hip and shoulder pad motions can be incorporated into the machine and still retain a single machine which massages all portions of the body without requiring the use of an attendant in order to change the patient from table to table.

Figure 25:
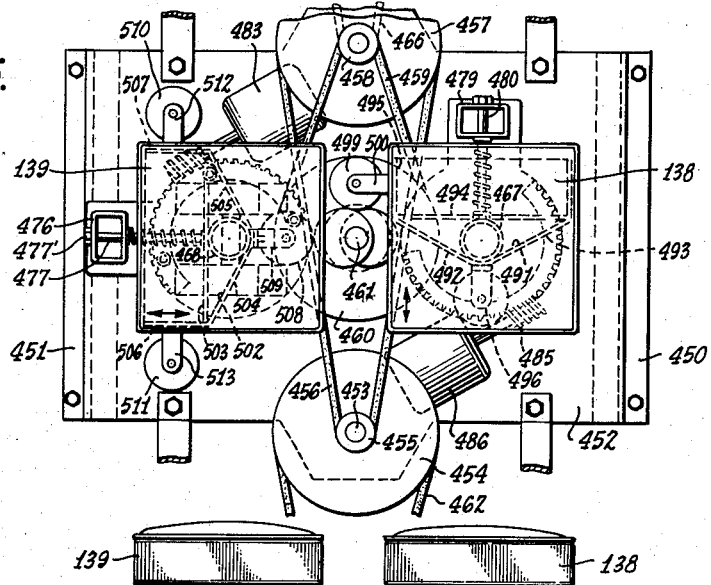
Figure 25 is a top plan view of a modified mechanism for moving the body pads in a number of directions relative to each other.
Figure 26:
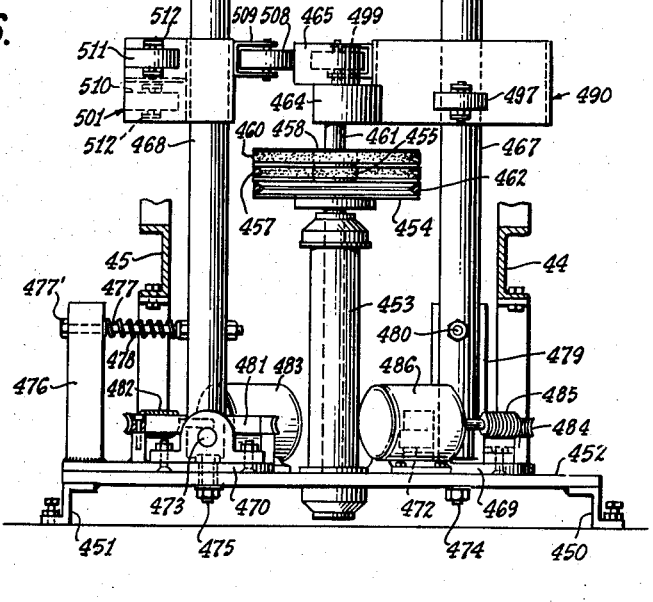
Figure 26 is a side elevational view of the mechanism illustrated in Figure 25 and showing the gear device for the supporting arms for the pads.

Another form of body pad actuation is illustrated in Figures 25 through 26, wherein an adjustable mechanism is utilized to adjust the direction of tilt of each individual pad in a desired manner. While only the hip pads are illustrated, it is understood that a similar mechanism can move the shoulder pads if movable shoulder pads are incorporated in the machine. In this modification, two frame members 450 and 451 are located upon the floor support for the machine and these members support a flat platform 452. A shaft support 453 is secured to platform 452 and carries a large pulley 454 and a smaller pulley 455. A belt 456 connects pulley 455 with pulley 457 which is supported by a shaft carried by platform 452 and pulley 457 has a smaller pulley 458 which is connected by belt 459 to a larger pulley carried by shaft 461 extending vertically upward and supported by platform 452. The pulley 454 is driven by a belt 462 which connects with the motor 117, which is utilized in all the forms of the invention to drive the body pads. The shaft 461 carries cams 464 and 465 which are 180 degrees out of phase and are of the same shape and are positioned side by side. These cams serve to actuate the hip pads 138 and 139 in the various manners to be described and it is understood that the pulley 457 can be a double pulley and drive through belt 466 a second shaft similar to shaft 461 carrying two cam portions which will serve to actuate the two shoulder pads positioned in the same manner as illustrated in Figures 1 and 2.

The hip pads 138 and 139 are supported by arms 467 and 468, respectively, which are pivotally connected to shafts 472 and 473, respectively, supported by plates 469 and 470, respectively, carried by platform 452. The plates 469 and 470 are pivotally connected to the platform 452 by means of shafts 474 and 475, respectively. The plate 470 carries an upright support 476 which, in turn, slidably mounts a shaft 477 having a stop 477'. The shaft 477 is secured to arm 468 and a coil spring 478 surrounds the shaft in order to continually bias the arm 468 away from the upright support 476 and to its unwound position determined by stop 477'. In a similar manner, an upright support 479 is secured to the plate 469 and slidably carries a shaft 480 which is connected to arm 467 and is surrounded by a spring similar to spring 478 to bias the arm 467 away from the upright support 479. The plate 470 also carries a gear segment 481 which is slightly more than 180 degrees. This gear segment cooperates with a worm gear 482 which is driven by a motor 483 which is secured to platform 452 and is independent of platform 470. In a like manner, the plate 469 carries a gear segment 484 of slightly more than 180 degrees and this gear segment cooperates with a worm gear 485 driven by a motor 486 which is secured to plate 452 and is independent of the plate 469. It is therefore apparent that actuation of motors 481 and 486 will rotate plates 470 and 469, respectively, in order to change the position of shafts 473 and 472, respectively.

The upper portion of arm 467 is secured to a frame member 490 having a triangular shaped opening 491, formed between sides 492 and 493 and center plate 494, through which arm 467 extends. The apex of the sides 492 and 493 carry a follower 497 by means of support 496 and the side 495 carries a follower 499 by support 500. As illustrated in Figure 26, the followers 499 and 497 are vertically staggered on the frame 490 so that the follower 499 will engage the cam 465 and the follower 497 will engage the cam 464 upon rotation of arm 467. In the position illustrated, it will be apparent that upon rotation of the cam 465, the pad 138 will be rocked longitudinally along the machine and the follower 499 will be held against the cam 465 by the force of the spring around bolt 480. However, if the frame member 490 and arm 467 are rotated by the motor 486 through 90 degrees, the follower 497 will be in position to engage the lower cam surface 464 and upon rotation of the shaft 467, the follower 497 will cause the pad 138 to rock in a direction transverse of the machine since the movement of the plate 469 will change the position of shaft 472 for the arm 467.

In a similar manner, the arm 468 is secured to frame 501 which has an opening 502, formed by center plate 503 and side members 504 and 505, through which arm 468 extends. The apex formed by sides 504 and 505 carries a follower 508 by means of a support 509 and sides 506 and 507 carry followers 510 and 511 by supports 512 and 513, respectively. As illustrated in Figure 26, the follower 511 is mounted to coact with the cam 465 while the follower 510 is positioned lower on the frame and coacts with the cam portion 464. The follower 508 is in line with the follower 511 in order to be actuated by the cam portion 465 and each of these followers can be moved into position by motor 483 to be actuated by corresponding cams. Thus, when followers 499 and 508 contact cams 465 and 466, respectively, the hip pad 138 will move longitudinally of the machine and the hip pad 139 will move transverse of the machine. When the followers 499 and 511 are positioned on opposite sides of the cam 465, the hip pads 138 and 139 will move longitudinally of the machine in unison since follower 499 will be on the high portion of cam 465 when follower 511 is on the low portion. However, when follower 510 is moved against the cam 464 and follower 449 is against the cam 465 and on the same side, the pads 138 and 139 will move out of phase and longitudinally of the machine. If the followers 497 and 508 are both in contact with the cams, the pads 138 and 139 will have opposed motion transversely of the machine. Thus, a wide variety of motions of the two pads can be obtained. It is understood that the machine can incorporate only these movable hip pads. However, if movable shoulder pads are incorporated, a similar mechanism can control the direction of the shoulder pads and the phase of the cams of the hip and shoulder pad mechanisms will determine the relative motion of the hip and shoulder pads. Thus, the modification of Figures 25 and 26 will also provide a wide variety of motions, either in phase or out of phase and either transverse or longitudinal, for the hip and shoulder pads. It is understood that this mechanism can be incorporated in the machine of Figures 1 and 2 and that the motor 117 which drives the pulley 454 has the two speed control under the control of row 1 of the card illustrated in Figure 12. Limit controls can be provided for the motors 486 and 483 so that the plates 469 and 470 will be properly positioned to obtain any type of desired pad motion.

By the present invention, a massage and exercise machine is provided in which leg motions and hip, body and arm motions are all incorporated into a single machine and can all be utilized by the patient without the necessity of an attendant being present. Various modifications of the leg, arm and body motions can be incorporated into the single machine in the manner described and all of these modifications can be controlled by the automatic control system. It is understood that the drive for the various components of the machine can be modified since various mechanisms can be utilized to accomplish the motions described. Also, while the machine consists of various mechanisms, such as the arm stretch, leg pads and body pads, all associated together, it is obvious that any single mechanism or any combination of mechanisms can be utilized in a machine and operated by the automatic control system. Various other modifications are contemplated by those skilled in the art without departing from the spirit and scope of the invention as hereinafter defined by the appended claims.

What is claimed is:

1. An exercise and massage machine comprising frame means head support means secured at one end of said frame means, body support means movably mounted by said frame means and located centrally of said frame means, arm exercising means movably mounted by said frame means at said one end, power drive means for moving said body support means relative to said frame means, and power drive means for moving said arm exercising means relative to said frame means and independently of said body support means.

2. An exercise and massage machine as defined in claim 1 having automatic control means for individually controlling the operation of each of said power drive means to preselect the sequence and duration of movement of said body support means and said arm exercising means.

3. An exercise and massage machine comprising frame means, support means carried by said frame means for supporting the patient in a substantially horizontal position, a rotatable shaft supported by said frame means and positioned transverse of said support means, a pair of rotating arms connected to opposite ends of said shaft and extending therefrom, a foot attachment pivotally connected to each said arms for rotation in a plane transverse to said shaft, means for rotating said shaft and the arms for both foot attachments, and separate means secured to each foot attachment and slidably and pivotally connected with a fixed support spaced from the foot attachment so that said separate means can move with said foot attachment and simultaneously move each foot attachment and relative to its supporting arm to rock the foot forwardly and backwardly about the ankle joint.

4. An exercise and massage machine as defined in claim 3 wherein said support means comprises a pair of leg pads located on opposite sides of said foot attachments to support the legs while the feet are detached from the foot attachments.

5. An exercise and massage machine comprising frame means, support means carried by said frame means for supporting the patient in a substantially horizontal position, an arm exercising means mounted for reciprocation at the head end of said support means, said exercising means comprising a mounting means carrying a plurality of hand bars spaced along the longitudinal axis of the machine at an elevation higher than the head and extending transversely of the longitudinal axis of the machine, means for reciprocating said mounting means independently of said support means, the reciprocating of said exercising means causing stretching of the arms and elevation of the rib cage and the amount of stretch being determined by the proximity of the hand bar gripped by the patient to the head of the patient, movable means located centrally of said frame means and forming a portion of said support means, said movable means comprising a pair of hip pads and a pair of shoulder pads to exercise both shoulder portions and both hip portions of the patient, and head rest means forming the head end of said support means, said arm exercising means being located vertically above said head rest means so that the patient extends the arms upwardly and along the head in order to grip said hand bars.

6. An exercise and massage machine comprising frame means, support means carried by said frame means for supporting the patient in a substantially horizontal position, an arm exercising means mounted for reciprocation at the head end of said support means, said exercising means comprising a mounting means carrying a plurality of hand bars spaced along the longitudinal axis of the machine at an elevation higher than the head and extending transversely of the longitudinal axis of the machine, power means for reciprocating said mounting means, independently of said support means, the reciprocating of said exercising means causing stretching of the arms and elevation of the rib cage and the amount of stretch being determined by the proximity of the hand bar gripped by the patient to the head of the patient, automatic control means for controlling said reciprocating means in order to initiate and stop said reciprocating means and determine the duration of operation, and punch card means for actuating said automatic control means.

7. An excess and massage machine comprising frame means, support means carried by said frame means for supporting the patient in a substantially horizontal position, an arm exercising means mounted for reciprocation at the head end of said support means, said exercising means comprising a mounting means carrying a plurality of hand bars spaced along the longitudinal axis of the machine at an elevation higher than the head and extending transversely of the longitudinal axis of the machine, power means for reciprocating said mounting means independently of said support means, the reciprocating of said exercising means causing stretching of the arms and elevation of the rib cage and the amount of stretch being determined by the proximity of the hand bar gripped by the patient to the head of the patient, said mounting means being pivotally connected at one end to said frame means, said hand bars being pivotally supported at the opposite end of said mounting means, and means for securing the hand bars at a selected angle relative to said mounting means to vary the direction in which the arms are moved.

8. An exercise and massage machine as defined in claim 7 wherein the pivotal support for said hand bars is slidably supported by said mounting means, and means for securing said hand bars at a selected position along said mounting means and relative to said support means to vary the direction in which the arms are moved.

9. An exercise and massage machine comprising frame means, support means carried by said frame means for supporting the patient in a substantially horizontal position, said support means including a body supporting means movably mounted by said frame means centrally of said support means and comprising a pair of hip pads and a pair of shoulder pads, cam means for bodily moving each of said pads in a complete, substantially circular path without tilting the said pads relative to the surface of said support means, means for rotating said cam means, automatic control means for controlling said rotating means in order to initiate and stop the movement of said hip and shoulder pads and determine the duration of movement, and punch card means for actuating said automatic control means.

10. An exercise and massage machine comprising frame means, support means carried by said frame means for supporting the patient in a substantially horizontal position, said support means including a body supporting means movably mounted by said frame means centrally of said support means and comprising a pair of hip pads and a pair of shoulder pads, cam means for bodily moving each of said pads in a complete, substantially circular path without tilting the said pads relative to the surface of said support means, means for rotating said cam means, said support means including head rest means located at the head end of said machine, said cam means moving each pad in opposition to the two adjacent pads so that the movement of the hip and shoulder pads is not transferred to the head of the patient and considerable energy can be transferred to the body without being uncomfortable, said shoulder pads being cut away at areas adjacent said head rest means, an extension on said head rest means extending into said cut away areas for supporting the shoulder hump of the patient, and vibrator means located on said extension for acting on said shoulder hump.

11. An exercise and massage machine comprising frame means, support means carried by said frame means for supporting the patient in a substantially horizontal position, said support means including a body supporting means movably mounted by said frame means centrally of said support means and comprising a pair of hip pads and a pair of shoulder pads, cam means for bodily moving each of said pads in a complete, substantially circular path without tilting the said pads relative to the surface of said support means, and means for rotating said cam means, the surface of each of said pads sloping downwardly toward the common corner of all the pads so that the pads act on the loosely suspended body tissue.

12. An exercise and massage machine comprising frame means, support means carried by said frame means for supporting the patient in a substantially horizontal position, said support means including body supporting means mounted by said frame means centrally of said support means and comprising a pair of body pads located side by side transversely of said frame means and supported by pivotally mounted arms, means for changing the position of the pivot for each arm so that either of said pads can tilt longitudinally or transverse of said machine, and cam means operative in each position of each arm to impart tilting motion to the pads.

13. An exercise and massage machine as defined in claim 12 wherein each arm mounts a plurality of cam followers some of which are spaced vertically from others, said cam means comprising two cam portions spaced vertically from one another in order to engage a different follower on each arm upon change in the position of the pivot for the arm.

14. An exercise and massage machine comprising frame means, support means carried by said frame means for supporting the patient in a substantially horizontal position, said support means comprising movable body pads located centrally of said machine, movable leg pads extending longitudinal of the machine and located at the foot end of the machine and a stationary head pad located at the head end of the machine, the legs and body of the patient being exercised by said pads without attachment to said pads, arm exercising means movably mounted at the head end of said machine and having a plurality of hand bars spaced longitudinal so that the patient can move the hands from one bar to another, and power means for moving said body pads, leg pads and hand bars independently of one another, said machine requiring no attachment of the patient by an attendant and requiring no adjustment of the machine to exercise all portions of any size of patient.

15. An exercise and massage machine as defined in claim 14 having automatic control means for said power means to control the duration and sequence of operation of the body pads, leg pads and hand bars so that treatment for each patient can be predetermined and accomplished without the aid of an attendant.

16. An exercise and massage machine as defined in claim 14 having a speaker carried by said head pad to remotely instruct the patient.

17. An exercise and massage machine comprising frame means, support means carried by said frame means for supporting the patient in a substantially horizontal position, said support means including a body supporting means movably mounted by said frame means centrally of said support means and comprising a pair of hip pads and a pair of shoulder pads, cam means for bodily moving each of said pads without tilting the said pads relative to the surface of said support means and means for rotating said cam means, said cam means comprising a separate circular cam for each pad carried in offset position by a vertical shaft, each of said pads having a circular follower extending downwardly to receive one of said cams, said rotating means comprising a separate drive means for each cam, the phase of said cams and the direction of rotation of said drive means being selected to provide the desired relative motion between the pads.

18. An exercise and massage machine as defined in claim 17 wherein the phase of said cams and the direction of rotation of said drive means is selected to cause the movement of each pad to oppose that of the two adjacent pads, and tie means secured to one or more pairs of pads, said tie means comprising a tie arm secured to each pad of the pair and extending at an angle to each other, and pivot means connecting said arms together at the apex of the angle in order to impart a degree of pivotal motion to portions of each pad of the pair connected by said tie means and prevent rubbing of the pads.

19. An exercise and massage machine as defined in claim 17 wherein the phase of said cams and the direction of rotation of said drive means is selected to cause the movement of each pad to oppose that of the two adjacent pads, and tie means secured to one or more pairs of pads, said tie means comprising a tie arm secured to one pad and movable in a slide carried by the other pad of the pair, said tie arm being transversely positioned with respect to said frame means to cause each pad of the pair to bodily move in a circular path.

20. An exercise and massage machine comprising frame means, support means carried by said frame means for supporting the patient in a substantially horizontal position, said support means comprising a pair of hip supporting pads, a pair of leg support means each movably mounted by linkage means attached to said frame means, each of said leg support means comprising a leg pad spaced from one of said hip supporting pads for supporting only the calf of the leg and the foot while the leg is extended, and power means for moving only said linkage means and each pad to exercise the leg, said power means comprising reversible motor means, coupling means for connecting said motor means with each of said linkage means, said coupling means including clutch means connected with one of said linkage means for moving said leg pads in phase upon rotation of said motor means in one direction and for moving said leg pads out of phase upon rotation of said motor means in the opposite direction.

21. An exercise and massage machine comprising frame means, support means carried by said frame means for supporting the patient in a substantially horizontal position, said support means comprising a pair of hip supporting pads, a pair of leg support means each movably mounted by linkage means attached to said frame means, each of said leg support means comprising a leg pad spaced from one of said hip supporting pads for supporting only the calf of the leg and the foot while the leg is extended, and power means for moving only said linkage means and each pad to exercise the leg, each of said linkage means comprising a hip pivot connected with said frame means at a point below one of said hip pads, a knee pivot connected with the one leg pad opposite said one hip pad, a first link pivotably connected at opposite ends to said pivots, a rotating crank arm supported by said frame means below said one leg pad and rotated by said power means, and a second link pivoted to said crank arm and rigidly fixed to said one leg pad at a point spaced from said knee pivot for moving said one leg pad up and down about both said pivots.

22. An exercise and massage machine as defined in claim 21 wherein said power means comprises reversible motor means, and coupling means for connecting said motor means with said crank arms for both said leg pads, said coupling means including clutch means connected with one of said crank arms for moving said one crank arm in phase with the other crank arm upon rotation of said motor means in one direction and for moving said one crank arm out of phase with the other crank arm upon rotation of said motor means in the opposite direction.

23. An exercise and massage machine as defined in claim 21 having a hand bar affixed to the side of each leg pad adjacent one of said knee pivots and extending upwardly and longitudinally toward said adjacent hip pad, and a hand grip on the end of each hand bar which moves in an elliptical path during movement of the leg pads by said power means.

24. An exercise and massage machine as defined in claim 21 having a hand bar affixed to each of said first links at a position between said hip pivot and said knee pivot and extending upwardly above said hip pads, and a hand grip on the end of each hand bar which moves back and forth during movement of the leg pads by said power means.

References Cited in the file of this patent

UNITED STATES PATENTS

| 1,482,173 | Willard | Sept. 13, 1922 |
| 1,602,196 | Iverson et al. | Oct. 5, 1926 |
| 2,332,184 | Sweeney | Oct. 19, 1943 |
| 2,427,053 | Hampton | Sept. 9, 1947 |
| 2,548,408 | Tammen | Apr. 10, 1951 |
| 2,591,212 | Stauffer | Apr. 1, 1952 |
| 2,666,429 | Alexander | Jan. 19, 1954 |
| 2,681,650 | Goss | June 22, 1954 |
| 2,688,323 | Miller | Sept. 7, 1954 |
| 2,689,127 | Silverton et al. | Sept. 14, 1954 |

FOREIGN PATENTS

| 385,711 | Great Britain | Jan. 5, 1933 |